United States Patent
Ishizaki et al.

(10) Patent No.: US 11,577,346 B2
(45) Date of Patent: Feb. 14, 2023

(54) WIRE FOR ELECTROSLAG WELDING, FLUX FOR ELECTROSLAG WELDING AND WELDED JOINT

(71) Applicant: Kobe Steel, Ltd., Kobe (JP)

(72) Inventors: Keito Ishizaki, Kanagawa (JP); Yimin Yuan, Kanagawa (JP); Hidenori Nako, Hyogo (JP); Tomoko Sugimura, Hyogo (JP); Yoshitomi Okazaki, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 692 days.

(21) Appl. No.: 16/332,308

(22) PCT Filed: Sep. 4, 2017

(86) PCT No.: PCT/JP2017/031694
§ 371 (c)(1),
(2) Date: Mar. 11, 2019

(87) PCT Pub. No.: WO2018/051823
PCT Pub. Date: Mar. 22, 2018

(65) Prior Publication Data
US 2019/0210166 A1    Jul. 11, 2019

(30) Foreign Application Priority Data

Sep. 13, 2016 (JP) .............................. JP2016-178802
Feb. 21, 2017 (JP) .............................. JP2017-030282

(51) Int. Cl.
*B23K 35/30* (2006.01)
*B23K 35/368* (2006.01)
(Continued)

(52) U.S. Cl.
CPC ...... *B23K 35/3066* (2013.01); *B23K 35/0261* (2013.01); *B23K 35/0266* (2013.01);
(Continued)

(58) Field of Classification Search
CPC ............ B23K 35/0261; B23K 35/0266; B23K 35/30; B23K 35/3066; B23K 35/3602;
(Continued)

(56) References Cited

U.S. PATENT DOCUMENTS 6,059,177 A    5/2000  Watanabe et al.
2004/0256370 A1*  12/2004  Keegan ............... B23K 35/3605
                                                    219/145.22

(Continued)

FOREIGN PATENT DOCUMENTS

CN      101808774          8/2010
CN      101808774 A   *    8/2010    ......... B23K 35/0261
(Continued)

OTHER PUBLICATIONS

Extended European Search Report dated Mar. 19, 2020, in Patent Application No. 17850726.5, 11 pages.
(Continued)

*Primary Examiner* — Dana Ross
*Assistant Examiner* — Adam Michael Eckardt
(74) *Attorney, Agent, or Firm* — Oblon, McClelland, Maier & Neustadt, L.L.P.

(57) ABSTRACT

Disclosed herein is an electroslag welding wire containing, by mass % based on total mass of the wire: C: more than 0% and 0.07% or less; Si: more than 0% and 0.50% or less; Mn: more than 0% and 1.0% or less; Ni: 6.0 to 15.0%; and Fe: 79% or more. The electroslag welding wire satisfies the following relationship (1): $0.150 \leq C+Si/30+Mn/20+Ni/60 \leq 0.300$ (1).

22 Claims, 1 Drawing Sheet

(51) Int. Cl.
*C22C 38/08* (2006.01)
*C22C 38/46* (2006.01)
*B23K 35/362* (2006.01)
*C22C 38/48* (2006.01)
*C22C 38/42* (2006.01)
*C22C 38/44* (2006.01)
*B23K 35/36* (2006.01)
*C22C 38/40* (2006.01)
*C22C 38/06* (2006.01)
*C22C 38/00* (2006.01)
*C22C 38/16* (2006.01)
*C22C 38/12* (2006.01)
*B23K 35/02* (2006.01)

(52) U.S. Cl.
CPC ............ *B23K 35/30* (2013.01); *B23K 35/361* (2013.01); *B23K 35/362* (2013.01); *B23K 35/3602* (2013.01); *B23K 35/3605* (2013.01); *B23K 35/3607* (2013.01); *B23K 35/368* (2013.01); *C22C 38/002* (2013.01); *C22C 38/005* (2013.01); *C22C 38/06* (2013.01); *C22C 38/08* (2013.01); *C22C 38/12* (2013.01); *C22C 38/16* (2013.01); *C22C 38/40* (2013.01); *C22C 38/42* (2013.01); *C22C 38/44* (2013.01); *C22C 38/46* (2013.01); *C22C 38/48* (2013.01)

(58) Field of Classification Search
CPC ............ B23K 35/3605; B23K 35/3607; B23K 35/361; B23K 35/362; B23K 35/368; B23K 2101/12; B23K 2103/04; B23K 25/00; B23K 33/006; B23K 35/3053; B23K 9/167; B23K 9/173; B23K 9/23; B23K 35/02; B23K 35/36; C22C 38/002; C22C 38/005; C22C 38/06; C22C 38/08; C22C 38/12; C22C 38/16; C22C 38/40; C22C 38/42; C22C 38/44; C22C 38/46; C22C 38/48; C22C 38/02; C22C 38/04; C22C 38/14; C22C 38/54; C22C 38/00; H04L 41/0213; H04L 41/0233; H04L 41/5003; H04L 12/24; H04L 12/26; H04W 24/02

See application file for complete search history.

(56) References Cited

U.S. PATENT DOCUMENTS

2009/0314759 A1* 12/2009 Schaeffer ............ B23K 35/0227
                                                            219/145.22
2016/0129532 A1   5/2016  Saruwatari et al.
2016/0271739 A1*  9/2016  Lee ................. C22C 38/002
2017/0368631 A1* 12/2017  Melfi .................. B23K 9/18
2019/0030655 A1*  1/2019  Watanabe .......... B23K 35/3602

FOREIGN PATENT DOCUMENTS

| JP | 50-71529 A | 6/1975 |
| JP | 55-165294 A | 12/1980 |
| JP | 60-111793 A | 6/1985 |
| JP | 2-220795 A | 9/1990 |
| JP | 11-138290 A | 5/1999 |
| JP | 2008/183570 A | 8/2008 |
| JP | 2009-154199 A | 7/2009 |
| JP | 2015-009247 A | 1/2015 |
| JP | 2016-20004 A | 2/2016 |
| JP | 5880662 B2 | 3/2016 |
| JP | 2016-93823 A | 5/2016 |

OTHER PUBLICATIONS

International Search Report dated Nov. 28, 2017 in PCT/JP2017/031694 5 pages (with English translation).
Written Opinion of the International Searching Authority and English Translation dated Nov. 28, 2017 in PCT/JP2017/031694 9 pages.

* cited by examiner

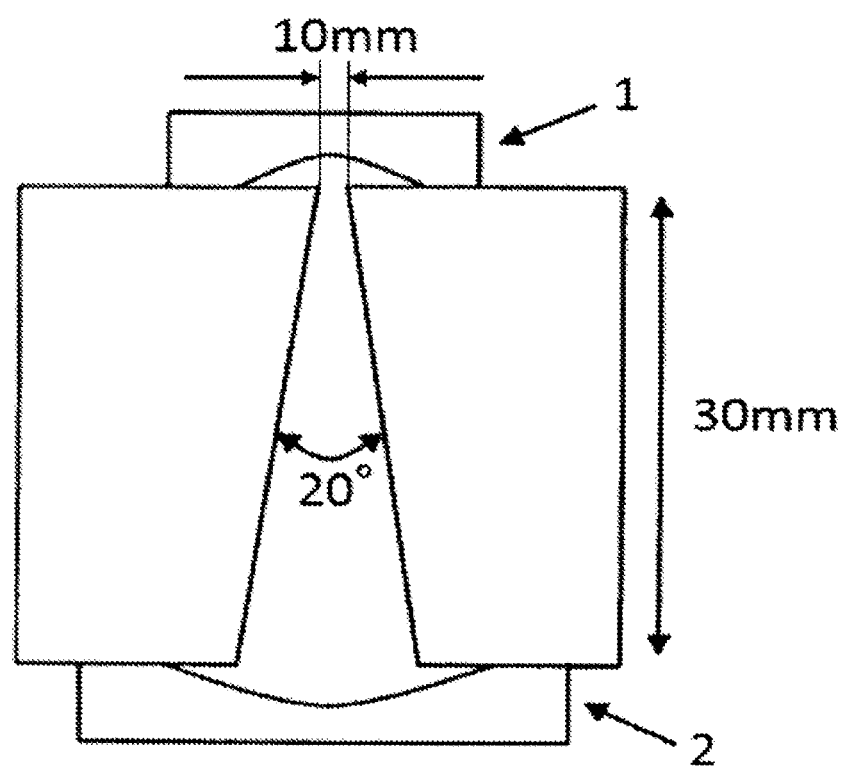

WIRE FOR ELECTROSLAG WELDING, FLUX FOR ELECTROSLAG WELDING AND WELDED JOINT

TECHNICAL FIELD

The present invention relates to a wire for use in electroslag welding of 5.0-10.0% Ni steel which is steel for cryogenic service to be applied to a tank for storing liquefied natural gas or the like at a low temperature or a chemical plant using the same gas, flux for use in the same welding, and a weld joint obtained using these weld materials.

BACKGROUND ART

9% Ni steel has high strength and excellent toughness at an ultralow temperature such as a liquid nitrogen temperature (−196° C.). The 9% Ni steel is therefore generally used as a base metal for manufacturing, by welding, storage tanks for storing liquefied natural gas (LNG) and the like at a low temperature. Those storage tanks are required to have excellent cryogenic toughness in a temperature range of −162° C. or less, which is a temperature range of liquid such as LNG. Therefore, a weld metal (i.e., weld portion) of a weld joint formed by welding the 9% Ni steel is also required to have similar excellent cryogenic toughness.

In the background art, a welding method such as coated arc welding, submerged arc welding or automatic TIG (Tungsten Inert Gas) welding using a Ni-based weld material has been used for welding of the 9% Ni steel. A weld metal obtained by these welding methods is excellent in cryogenic toughness, but lower in strength than the 9% Ni steel as a base metal. Thus, there is a problem that a design plate thickness for a structure must be increased in accordance with the strength of a Ni-based weld metal portion. On the other hand, iron and steel companies have promoted reduction of Ni amount in steel for cryogenic service, and have researched to put 7% Ni steel or 5% Ni steel into practical use.

Patent Literatures 1 to 4 propose welding solid wires or gas shielded arc welding flux cored wires for steel for cryogenic service. According to each of the present inventions, heat input is about 1.4 to 2.2 kJ/mm with efficiency improved by gas shielded arc welding using pure Ar gas or Ar gas containing 2% or less of oxygen, carbon dioxide gas or He gas, in comparison with TIG welding. However, an operation method with higher efficiency is desired.

CITATION LIST

Patent Literature

Patent Literature 1: JP-A-2015-9247
Patent Literature 2: JP-A-2016-20004
Patent Literature 3: JP-A-2016-93823
Patent Literature 4: Japanese Patent No. 5880662

SUMMARY OF INVENTION

Technical Problem

An object of the present invention is to provide a weld joint having a high efficiency, for example, an amount of heat input of 10 kJ/mm or more, and including a weld metal excellent in mechanical properties such as strength and cryogenic properties.

Solution to Problem

The present inventors researched a high-efficiency welding operation method capable of obtaining predetermined mechanical properties in a weld metal joint using a weld material of a Ni base or about 5.0 to 10.0% Ni. As a result, the present inventor et al. found an electroslag welding wire and flux capable of high-efficiency welding with an amount of heat input of 10.0 kJ/mm or more and capable of obtaining predetermined mechanical properties, and a weld metal chemical component system using the wire and the flux.

That is, the electroslag welding wire according to the present invention capable of solving the aforementioned problem is an electroslag welding wire containing, by mass % based on total mass of the wire:
C: more than 0% and 0.07% or less;
Si: more than 0% and 0.50% or less;
Mn: more than 0% and 1.0% or less;
Ni: 6.0 to 15.0%; and
Fe: 79% or more,
wherein the electroslag welding wire satisfies the following relationship (1).

$$0.150 \leq C + Si/30 + Mn/20 + Ni/60 \leq 0.300 \quad (1)$$

Alternatively, the electroslag welding wire according to the present invention capable of solving the aforementioned problem is an electroslag welding wire containing, by mass % based on total mass of the wire:
C: more than 0% and 0.07% or less;
Si: more than 0% and 0.50% or less;
Mn: more than 0% and 1.0% or less;
Ni: 6.0 to 15.0%; and
Fe: 79% or more,
wherein the electroslag welding wire further contains at least one element selected from the group consisting of Cu, Cr, Mo, W, Nb, V and B, and satisfies the following relationship (2).

$$0.150 \leq C + Si/30 + W/30 + Mn/20 + Cu/20 + Ni/60 + Cr/20 + Mo/15 + Nb/10 + V/10 + 5 \times B \leq 0.300 \quad (2)$$

According to a preferred embodiment of the present invention, the electroslag welding wire further contains at least one element selected from the group consisting of Ca, Mg, REM, Zr, Al and Ti and satisfies the following relationship (3).

$$0.001 \leq 1.6(Ca+Mg) + 1.25(REM+Zr) + Al + 0.8Ti \leq 0.70 \quad (3)$$

According to a preferred embodiment of the present invention, the electroslag welding wire is a solid wire or a flux cored wire.

According to a preferred embodiment of the present invention, the electroslag welding wire is a flux cored wire containing a slag forming agent in an amount of more than 0% and not more than 15% based on total mass of the wire, wherein the slag forming agent contains at least one selected from the group consisting of $SiO_2$, CaO, $CaF_2$, $BaF_2$, MgO, $Al_2O_3$, MnO, $TiO_2$, $ZrO_2$, FeO, $Na_2O$, $K_2O$, and BaO, and satisfies the following relationship (4).

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (4)$$

The left side is taken as >100 when the slag forming agent does not contain any of $SiO_2$, $Al_2O_3$, $TiO_2$, $ZrO_2$, MnO and FeO.

According to a preferred embodiment of the present invention, the wire has been plated with Cu.

The flux according to the present invention capable of solving the aforementioned problem is a flux used for electroslag welding together with any one of the aforementioned electroslag welding wires, the flux containing by mass %:

SiO$_2$: 0 to 35%;
CaO: 5 to 60%;
CaF$_2$: 3 to 50%;
BaF$_2$: 0 to 20%;
MgO: 0 to 20%;
Al$_2$O$_3$: 0 to 65%;
MnO: 0 to 20%;
TiO$_2$: 0 to 10%;
ZrO$_2$: 0 to 10%;
FeO: 0 to 5%;
Na$_2$O: 0 to 10%;
K$_2$O: 0 to 10%; and
BaO: 0 to 20%, and
the flux satisfying the following relationship (5).

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (5)$$

The left side is taken as >100 when the slag forming agent does not contain any of SiO$_2$, Al$_2$O$_3$, TiO$_2$, ZrO$_2$, MnO and FeO.

In addition, the weld joint according to the present invention capable of solving the aforementioned problem is a weld joint produced by electroslag welding using any one of the aforementioned electroslag welding wires and any one of the aforementioned flux for electroslag welding, wherein a weld metal in the weld joint contains, by mass %:

C: more than 0% and 0.07% or less;
Si: more than 0% and 0.50% or less;
Mn: more than 0% and 1.0% or less; and
Ni: 6.0 to 15.0%, with the remainder consisting of Fe and inevitable impurities, and wherein the weld metal satisfies the following relationship (6).

$$0.150 \leq C+Si/30+Mn/20+Ni/60 \leq 0.300 \quad (6)$$

Alternatively, the weld joint according to the present invention capable of solving the aforementioned problem is a weld joint produced by electroslag welding using any one of the aforementioned electroslag welding wires and any one of the aforementioned flux for electroslag welding, wherein a weld metal in the weld joint contains, by mass %:

C: more than 0% and 0.07% or less;
Si: more than 0% and 0.50% or less;
Mn: more than 0% and 1.0% or less;
Ni: 6.0 to 15.0%; and
at least one element selected from the group consisting of Cu, Cr, Mo, W, Nb, V and B, with the remainder consisting of Fe and inevitable impurities, and wherein the weld metal satisfies the following relationship (7).

$$0.150 \leq C+Si/30+W/30+Mn/20+Cu/20+Ni/60+Cr/20+Mo/15+Nb/10+V/10+5 \times B \leq 0.300 \quad (7)$$

According to a preferred embodiment of the present invention, in the weld joint, the weld metal further contains, by mass %:

O: 0% or more, and 0.025% or less; and
N: 0% or more, and 0.010% or less.

According to a preferred embodiment of the present invention, the weld joint uses a steel plate containing 5 to 10% of Ni as a base metal.

Advantageous Effects of Invention

According to the present invention, it is possible to provide a weld joint with a weld metal excellent in strength and cryogenic toughness even in high heat input welding, for example, with an amount of heat input of 10 kJ/mm or more.

BRIEF DESCRIPTION OF DRAWINGS

FIG. 1 is a view of a schematic configuration of groove welding in Examples.

DESCRIPTION OF EMBODIMENTS

In order to solve the foregoing problem, the present inventors conducted research through the use of electroslag welding, which had not been examined in the background art, as high heat input welding using a weld material with about 6.0 to 15.0% of Ni. As a result, the present inventors found that a weld joint with a weld metal excellent in strength and cryogenic toughness can be obtained in spite of high heat input welding, for example, with an amount of heat input of 10 kJ/mm or more by using a weld material having components adjusted properly was used. Thus, the present inventors completed the present invention.

Here, the electroslag welding is a method in which a welding wire is put into a molten slag bath so that a base metal and the welding wire are melted mainly using Joule heat of the molten slag as a heat source. By the electroslag welding, vertical welding of a structure having a large plate thickness in a field of shipbuilding, industrial machinery, or the like can be performed in a single pass. The vertical welding of such a structure has been performed by electro-gas arc welding in the background art. However, there has been a problem on a working environment for welding workers, such as heat radiated from an arc, fumes, spatter, etc. Further, there is another problem that when the plate thickness increases, shielding may deteriorate to degrade the mechanical performance of a weld portion.

On the other hand, according to the electroslag welding, a wire and a base metal are melted not by an exposed arc as in electrogas arc welding but by heat generated in molten slag. Thus, heat radiated by the arc is not generated, and generation of fumes or spatter is reduced. As a result, the working environment is improved. In addition, a weld metal is shielded from the atmosphere by the molten slag. Thus, shielding gas is not required. Even when the plate thickness increases, there is no fear that the shield effect deteriorates. Regardless of the plate thickness, nitrogen and the like in the atmosphere can be effectively prevented from entering the molten metal. Thus, mechanical deterioration of the weld metal is less likely to occur.

In the present description, the electroslag welding wire is sometimes simply referred to as wire.

The present invention is described below in detail. Here, unless otherwise specifically noted, % denotes mass %. In addition, "–" denotes a range of the lower limit value or more and the upper limit value or less.

(Electroslag Welding Wire)

The electroslag welding wire according to the present invention contains the following components. In the present invention, a flux cored wire is preferably used as will be described later. In this case, each component of the electroslag welding wire is described as percentage by mass of the component contained in the flux cored wire with respect to the total mass of the flux cored wire. The total mass of the flux cored wire is a total of the mass of a hoop and the mass of a flux.

C: more than 0% and 0.07% or less

C is an element which strengthens a solid solution and forms a compound to thereby contribute to securing strength. In order to effectively exert the aforementioned effect, the content of C is preferably 0.003% or more. However, when an excessive amount of C is added, the number of compound particles increases so that the compound particles act as starting points of void formation in a charpy test. Thus, cryogenic toughness deteriorates. Therefore, the content of C is 0.07% or less. The content of C is preferably 0.05% or less.

Si: more than 0% and 0.50% or less

Si is a deoxidizing element, which has an effect of reducing the concentration of oxygen in the weld metal to thereby improve the cryogenic toughness. In order to effectively exert the aforementioned effect, the content of Si is preferably 0.003% or more. However, excessive addition of Si causes excessive increase of strength. Thus, cryogenic toughness deteriorates. Therefore, the content of Si is 0.50% or less. The content of Si is preferably 0.40% or less.

Mn: more than 0% and 1.0% or less

Mn is an element which strengthens a solid solution to thereby contribute to securing strength. When the content of Mn is insufficient, predetermined strength cannot be obtained. Therefore, the content of Mn is preferably 0.01% or more. However, excessive addition of Mn causes excessive increase of strength. Thus, cryogenic toughness deteriorates. Therefore, the content of Mn is 1.0% or less. The content of Mn is preferably 0.9% or less.

Ni: 6.0-15.0%

Ni is an essential element for securing low temperature toughness. The content of Ni is 6.0% or more. The content of Ni is preferably 7.0% or more. However, excessive addition of Ni causes increase of strength. Thus, cryogenic toughness deteriorates. Therefore, the content of Ni is 15.0% or less. The content of Ni is preferably 14.0% or less.

Fe: 79% or more

Fe is a basic component as in the case of a base metal to be joined. In order to secure component continuity of a joint composed of the base metal and the weld metal, the content of Fe is 79% or more. When the content of Fe is less than 79%, it is necessary to add another alloy component or a slag forming agent more than a specified amount. As a result, the strength of the weld metal is excessive so that the cryogenic toughness deteriorates. The content of Fe is preferably 82% or more.

Although the effects of the respective components are described above, there is a case that required mechanical properties are not satisfied even when the contents of the components are within their specified component ranges. Therefore, the present inventors carried out deeper researches and examinations. As a result, the present inventors found out the relationship (1) among alloy components preventing coarsening of a structure of a weld metal and obtaining a fine structure to thereby satisfy the mechanical properties in high heat input electroslag welding. Each component such as C or Si in the relationship (1) designates the content (mass %) of the component with respect to the total mass of the wire, but its unit is not shown in the relationship (1). The same is applied to the relationships (2) and (3) which are described later.

$$0.150 \leq C+Si/30+Mn/20+Ni/60 \leq 0.300 \quad (1)$$

When the parameter of the relationship (1) is less than 0.150, predetermined strength cannot be obtained. The parameter of the relationship (1) is preferably 0.160 or more, and more preferably 0.170 or more. On the other hand, when the parameter of the relationship (1) is more than 0.300, the strength of the weld metal is excessive so that the cryogenic toughness deteriorates. The parameter of the relationship (1) is preferably 0.290 or less, and more preferably 0.280 or less.

In the same manner, there is a case that required mechanical properties are not satisfied in spite of the specified component ranges. Therefore, the present inventors carried out further deeper researches and examinations. As a result, the present inventors found out the relationship (2) among alloy components preventing coarsening of a structure of a weld metal and obtaining a fine structure to thereby satisfy the mechanical properties in high heat input electroslag welding using a wire containing at least one element selected from the group consisting of Cu, Cr, Mo, W, Nb, V and B.

$$0.150 \leq C+Si/30+W/30+Mn/20+Cu/20+Ni/60+Cr/20+Mo/15+Nb/10+V/10+5 \times B \leq 0.300 \quad (2)$$

Cu, Cr, Mo, W, Nb, V and B are elements contributing to securing the strength. When the parameter of the relationship (2) is less than 0.150, predetermined strength cannot be obtained. The parameter of the relationship (2) is preferably 0.160 or more, and more preferably 0.170 or more. On the other hand, when the parameter of the relationship (2) is more than 0.300, the strength of the weld metal is excessive so that the cryogenic toughness deteriorates. The parameter of the relationship (2) is preferably 0.290 or less, and more preferably 0.280 or less.

More preferable ranges of the aforementioned contents of Cu, Cr, Mo, W, Nb, V and B are described below.
More preferable ranges:
Cu: 0.45% or less
Cr: 0.50% or less
Mo: 0.55% or less
W: 0.50% or less
Nb: 0.20% or less
V: 0.20% or less
B: 0.01% or less In addition, it is preferable to further contain at least one element selected from the group consisting of Ca, Mg, REM, Zr, Al and Ti, and to satisfy the relationship:

$$0.001 \leq 1.6(Ca+Mg)+1.25(REM+Zr)+Al+0.8Ti \leq 0.70 \quad (3)$$

Ca, Mg, REM, Zr, Al and Ti are deoxidizing elements, which have an effect of reducing the concentration of oxygen in the weld metal to thereby improve the cryogenic toughness. In order to exert such an effect effectively, the parameter of the relationship (3) is preferably 0.001 or more. However, in a case of high heat input welding with a large amount of heat input as in the present invention, the cooling rate after welding is so low that coarsening tends to proceed due to aggregation or coalescence of oxides, as described previously. Therefore, excessive addition increases coarse oxides. In order to secure the cryogenic toughness, the parameter of the relationship (3) is preferably 0.70 or less. In addition, the parameter of the relationship (3) is more preferably 0.10 or more.

More preferable ranges of the aforementioned contents of Ca, Mg, REM, Zr, Al and Ti are described below.

More preferable ranges:
Ca: 0.0005-0.20%;
Mg: 0.0005-0.20%;
REM: 0.001-0.20%;
Zr: 0.001-0.15%;
Al: 0.001-0.20%;
Ti: 0.001-0.10%

The remainder of the electroslag welding wire according to the present invention, for example, consists of inevitable impurities. Examples of the inevitable impurities include P, S, As, Sb, Sn, Bi, O, N, etc. In addition, as other components that can be contained in the electroslag welding wire according to the present invention, the aforementioned inevitable impurities or other elements may be aggressively added unless they reduce the effect of the present invention.

It is preferable that the electroslag welding wire according to the present invention has a surface plated with Cu in order to enhance the electrical conductivity. The Cu plating amount is preferably 0.10% or more and 0.30 or less.

The electroslag welding wire according to the present invention may be either a solid wire or a flux cored wire. Of them, the flux cored wire is a wire in which the inside of a shell (hereinafter also referred to as hoop) is filled with flux. Components of the flux cored wire can be easily designed. In addition, the flux cored wire is excellent in deposition rate, deposition efficiency, etc.

The composition of the aforementioned hoop is not particularly limited as long as the composition of the flux cored wire is within the aforementioned ranges.

Fluxes of flux cored wires are roughly classified into oxide/fluoride-based ones and metal-based ones. The metal-based flux cored wires are sometimes called metal cored wires (MCW).

The flux filling ratio of the flux cored wire is preferably 5-25%. Outside that range, there arises a problem such as deterioration in workability. Here, the flux filling ratio is defined as a ratio of the mass of the flux with which the hoop is filled to the total mass of the wire. The total mass of the wire is a total of the mass of the hoop and the mass of the flux.

Fluxes for the flux cored wire are roughly classified into oxide/fluoride-based ones and metal-based ones. The metal-based flux satisfies the aforementioned ranges of the wire composition. The oxide/fluoride-based flux (i.e., slag forming agent) is contained in an amount of more than 0% and 15% or less with respect to the total mass of the wire. The oxide/fluoride-based flux contains at least one selected from the group consisting of $SiO_2$, CaO, $CaF_2$, $BaF_2$, MgO, $Al_2O_3$, MnO, $TiO_2$, $ZrO_2$, FeO, $Na_2O$, $K_2O$, and BaO, and satisfies the following relationship (4). Each component such as CaO or $CaF_2$ in the relationship (4) designates the content (mass %) of the component with respect to the total mass of the wire.

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (4)$$

The left side is taken as >100 when the slag forming agent does not contain any of $SiO_2$, $Al_2O_3$, $TiO_2$, $ZrO_2$, MnO and FeO.

When the slag forming agent is used, the slag forming agent is melted and formed into slag during electroslag welding, so that the slag protects molten metal and prevents nitrogen and oxygen from entering the molten metal from the atmosphere. Further, when the slag forming agent is regulated within the range of the composition relationship (4), the content of oxygen in the weld metal is reduced, and the cryogenic toughness is improved. The parameter of the relationship (4) is preferably 1.00 or more, and more preferably 1.30 or more. In the slag forming agent, carbonate such as $CaCO_3$, $BaCO_3$ or $MgCO_3$ may be used as flux filler to be filled in the hoop. However, the carbonate is decomposed by heat during welding so as to generate $CO_2$ gas and increase the content of oxygen in the weld metal to thereby affect the cryogenic toughness. It is therefore preferable not to use any carbonate as flux filler. When carbonate is used, the parameter of the relationship (4) is calculated in consideration of the thermal decomposition of the carbonate so that an amount corresponding to $CO_2$ is excluded from the actual weight of the carbonate. That is, the contents of $CaCO_3$, $BaCO_3$ and $MgCO_3$ are converted into the contents of CaO, BaO and MgO respectively.

A method for manufacturing the flux cored wire is not particularly limited, but it may be manufactured by a general process. For example, the flux cored wire is manufactured as follows. That is, a hoop of soft steel is formed into a U-shape. The U-shaped hoop is filled with flux, and then molded into a cylindrical shape internally filled with the flux. The hoop filled with the flux is drawn to have an intended diameter.

(Flux)

During electroslag welding, flux is additionally put to compensate molten slag which is reduced with the advance of the welding. This flux is referred to as flux simply in the present description. In the electroslag welding, with the advance of the welding, molten metal is cooled and formed into a weld metal, and a part of a molten slag bath is formed into a molten slag layer. With the advance of the welding, the molten slag layer is cooled and formed into solidified slag. Thus, the molten slag is consumed. Flux is used for compensating the reduction of the molten slag bath. The flux is roughly classified into melt flux and bond (i.e., baked) flux. The melt flux is manufactured by melting and crushing various raw materials in an electric furnace or the like. On the other hand, the baked flux is manufactured as follows. That is, various raw materials are bound by a binder such as alkaline silicate, granulated, and then baked. The baked flux sometimes uses the aforementioned carbonate as a raw material. However, the carbonate is decomposed by heat during welding so as to generate $CO_2$ gas and increase the content of oxygen in the weld metal to thereby affect the cryogenic toughness. It is therefore preferable to use the melt flux.

The flux to be used in the present invention has the following composition.

$SiO_2$: 0-35%

$SiO_2$ is an acidic component, which is a component for adjusting the viscosity and the melting point of the molten slag. In the present invention, the viscosity and the melting point can be adjusted by other components. Thus, $SiO_2$ does not have to be contained. On the other hand, if contained, when the content of $SiO_2$ is more than 35%, the viscosity of the molten slag is high, which causes lack of penetration. The content of $SiO_2$ is preferably 35% or less, and more preferably 30% or less.

CaO: 5-60%

CaO is a basic component, which is a component effective in adjusting the viscosity and the melting point of the molten slag, and which is also highly effective in reducing the content of oxygen in the weld metal. When the content of CaO is less than 5%, the content of oxygen in the weld metal increases. Therefore, the content of CaO is preferably 5% or more, and more preferably 10% or more. However, when the content of CaO is more than 60%, undercut and slag entanglement occur. Therefore, the content of CaO is preferably 60% or less, and more preferably 55% or less.

$CaF_2$: 3-50%

$CaF_2$ is also a basic component, which is a component effective in adjusting the viscosity and the melting point of the molten slag, and which is also high in effect of reducing the content of oxygen in the weld metal. When the content of $CaF_2$ is less than 3%, the content of oxygen in the weld metal increases. Therefore, the content of $CaF_2$ is preferably 3% or more, and more preferably 5% or more. However, when the content of $CaF_2$ is more than 50%, undercut and slag entanglement tend to occur, and welding is unstable due to fluoride gas generated during the welding. Therefore, the content of $CaF_2$ is preferably 50% or less, and more preferably 45% or less.

$BaF_2$: 0-20%

$BaF_2$ is also a basic component, which is a component effective in adjusting the viscosity and the melting point of the molten slag, and which is also high in effect of reducing the content of oxygen in the weld metal. In the present invention, the viscosity and the melting point, and further the content of oxygen in the weld metal can be adjusted by other components. Thus, $BaF_2$ does not have to be contained. On the other hand, if contained, when the content of $BaF_2$ is more than 20%, the melting point of the molten slag is so low that the viscosity is insufficient. Thus, the molten slag is too easily discharged from between a sliding copper backing and the weld metal. As a result, the weld metal which cannot be held by the molten slag burns through. Therefore, the content of $BaF_2$ is preferably 20% or less, and more preferably 15% or less.

MgO: 0-20%

MgO is also a basic component, which is a component effective in adjusting the viscosity and the melting point of the molten slag. In the present invention, the viscosity and the melting point can be adjusted by other components. Thus, MgO does not have to be contained. On the other hand, if contained, when the content of MgO is more than 20%, the melting point of the molten slag is so high that the viscosity is also high enough to cause a lack of joint penetration. Therefore, the content of MgO is preferably 20% or less, and more preferably 15% or less.

$Al_2O_3$: 0-65%

$Al_2O_3$ is a component effective in adjusting the viscosity and the melting point of the molten slag. In the present invention, the viscosity and the melting point can be adjusted by other components. Thus, $Al_2O_3$ does not have to be contained. On the other hand, if contained, when the content of $Al_2O_3$ is more than 65%, the viscosity of the molten slag is high, which causes lack of penetration. Therefore, the content of $Al_2O_3$ is preferably 65% or less, and more preferably 60% or less.

In addition, the content of $Al_2O_3$ is preferably 3% or more.

MnO: 0-20%

MnO is a component effective in adjusting the viscosity and the melting point of the molten slag. In the present invention, the viscosity and the melting point can be adjusted by other components. Thus, MnO does not have to be contained. On the other hand, if contained, when the content of MnO is more than 20%, the melting point of the molten slag is so low that the viscosity is insufficient. Thus, the molten slag is too easily discharged from between the sliding copper backing and the weld metal. As a result, the weld metal which cannot be held by the molten slag burns through. Therefore, the content of MnO is preferably 20% or less, and more preferably 15% or less.

$TiO_2$: 0-10% and $ZrO_2$: 0-10%

$TiO_2$ and $ZrO_2$ are components effective in adjusting the melting point of the molten slag. In the present invention, the melting point can be adjusted by other components. Thus, $TiO_2$ and $ZrO_2$ do not have to be contained. On the other hand, if contained, when the content of each of $TiO_2$ and $ZrO_2$ is more than 10%, the viscosity increases suddenly near the melting point so as to easily cause slag entanglement. Therefore, the content of each of $TiO_2$ and $ZrO_2$ is preferably 10% or less, and more preferably 5% or less.

FeO: 0-5%

FeO is a component effective in adjusting the viscosity and the melting point of the molten slag, and is also highly effective in reducing the content of oxygen in the weld metal. In the present invention, the viscosity and the melting point can be adjusted by other components. Thus, FeO does not have to be contained. On the other hand, if contained, when the content of FeO is more than 5%, slag generated in a bead surface tends to seize up thereon. Therefore, the content of FeO is preferably 5% or less, and more preferably 3% or less.

$Na_2O$: 0-10%

$Na_2O$ is a component very effective in adjusting the viscosity of the molten slag. In the present invention, the viscosity and the melting point can be adjusted by other components. Thus, $Na_2O$ does not have to be contained. On the other hand, if contained, when the content of $Na_2O$ is more than 10%, the melting point of the molten slag is so low that the viscosity is insufficient. Thus, the molten slag is too easily discharged from between the sliding copper backing and the weld metal. As a result, the weld metal which cannot be held by the molten slag burns through. Therefore, the content of $Na_2O$ is preferably 10% or less, and more preferably 7% or less.

$K_2O$: 0-10%

$K_2O$ is a component very effective in adjusting the viscosity of the molten slag. In the present invention, the viscosity and the melting point can be adjusted by other components. Thus, $K_2O$ does not have to be contained. On the other hand, if contained, when the content of $K_2O$ is more than 10%, the melting point of the molten slag is so low that the viscosity is insufficient. Thus, the molten slag is too easily discharged from between the sliding copper backing and the weld metal. As a result, the weld metal which cannot be held by the molten slag burns through. Therefore, the content of $K_2O$ is preferably 10% or less, and more preferably 7% or less.

BaO: 0-20%

BaO is a basic component, which is a component effective in adjusting the viscosity and the melting point of the molten slag, and which is also highly effective in reducing the content of oxygen in the weld metal. In the present invention, the viscosity and the melting point can be adjusted by other components. Thus, BaO does not have to be contained. On the other hand, if contained, when the content of BaO is more than 20%, the melting point of the molten slag is so low that the viscosity is insufficient. Thus, the molten slag is too easily discharged from between the sliding copper backing and the weld metal. As a result, the weld metal which cannot be held by the molten slag burns through. Therefore, the content of BaO is preferably 20% or less, and more preferably 15% or less.

It is preferable that the composition of the flux has a content of each component within a limited range thereof and satisfies the following relationship (5) in order to effectively reduce the content of oxygen in the weld metal and to improve the toughness of the weld metal portion.

Each component such as CaO or $CaF_2$ in the relationship (5) designates a content (mass %) of the component with respect to the total mass of the flux.

$$(CaO+CaF_2+BaF_2+MgO+BaO+Na_2O+K_2O)/(SiO_2+0.5(Al_2O_3+TiO_2+ZrO_2+MnO+FeO))\geq 1.00 \quad (5)$$

The left side is taken as >100 when the flux does not contain any of $SiO_2$, $Al_2O_3$, $TiO_2$, $ZrO_2$, MnO and FeO.

The flux according to the present invention has the aforementioned composition with the remainder consisting of inevitable impurities such as P, S, As, Sb, Sn, Bi, etc.

(Weld Joint)

The weld joint according to the present invention is manufactured by electroslag welding using the aforementioned electroslag welding wire and the aforementioned flux. The weld metal in the weld joint has the same composition (content of each component) as the composition of the electroslag welding wire, except that the remainder consists of Fe and inevitable impurities. The operation and the effect of each component are also the same. Accordingly, in the following description, the operation and the effect of each component overlapping with that in the electroslag welding wire described previously will be omitted to avoid redundant description, and only a preferable range thereof will be described.

C: more than 0% and 0.07% or less
preferable upper limit: 0.06%
Si: more than 0% and 0.50% or less
preferable upper limit: 0.40%, more preferably 0.30%
Mn: more than 0% and 1.0% or less
preferable upper limit: 0.8%
Ni: 6.0-15.0%
preferable lower limit: 7.0%
preferable upper limit: 14.0%, more preferably 12.0%

In addition, the weld metal in the weld joint satisfies the following relationship (6). Each component such as C or Si in the relationship (6) designates the content (mass %) of the component with respect to the total mass of the weld metal, but its unit is not shown in the relationship (6).

$$0.150 \leq C+Si/30+Mn/20+Ni/60 \leq 0.300 \quad (6)$$

The present inventors found out a technical significance in that the weld metal satisfies the relationship (6) from a similar viewpoint to that in the relationship (1) in the aforementioned wire. When the parameter of the relationship (6) is less than 0.150, predetermined strength cannot be obtained. The parameter of the relationship (6) is preferably 0.160 or more, and more preferably 0.170 or more. On the other hand, when the parameter of the relationship (6) is more than 0.300, the strength of the weld metal is so high that the cryogenic toughness deteriorates. The parameter of the relationship (6) is preferably 0.290 or less, and more preferably 0.280 or less.

In addition, when the weld metal in the weld joint further contains at least one element selected from the group consisting of Cu, Cr, Mo, W, Nb, V and B, the weld metal satisfies the following relationship (7). Each component such as C or Si in the relationship (7) designates the content (mass %) of the component with respect to the total mass of the weld metal, but its unit is not shown in the relationship (7).

$$0.150 \leq C+Si/30+W/30+Mn/20+Cu/20+Ni/60+Cr/20+Mo/15+Nb/10+V/10+5\times B \leq 0.300 \quad (7)$$

Cu, Cr, Mo, W, Nb, V and B are elements contributing to securing the strength. The present inventors found out a technical significance in that the weld metal satisfies the relationship (7) from a similar viewpoint to that in the relationship (2) in the aforementioned wire. When the parameter of the relationship (7) is less than 0.150, predetermined strength cannot be obtained. The parameter of the relationship (7) is preferably 0.160 or more, and more preferably 0.170 or more. On the other hand, when the parameter of the relationship (7) is more than 0.300, the strength of the weld metal is so high that the cryogenic toughness deteriorates. The parameter of the relationship (7) is preferably 0.290 or less, and more preferably 0.280 or less.

The preferable content of each of Cu, Cr, Mo, W, Nb, V and B in the weld metal is the same as the preferable content of the component in the wire.

O: 0% or more and 0.025% or less

O forms oxides. The oxides act as starting points of void formation in a charpy test. Thus, the cryogenic toughness deteriorates. Therefore, the content of O is preferably 0.025% or less, and more preferably not contained.

N: 0% or more and 0.010% or less

N acts as a solid solution element reinforcing the matrix of the weld metal portion, and also acts as an element triggering a brittle fracture. Thus, the cryogenic toughness deteriorates. Therefore, the content of N is preferably 0.010% or less, and more preferably not contained.

The weld metal according to the present invention has the aforementioned fundamental composition. The remainder consists of: iron; Cu, Cr, Mo, W, Nb, V and B added from the wire; Ca, Mg, REM, Al, Zr and Ti added as deoxidizing agents and partially left behind as slag in the weld metal without being discharged therefrom; and inevitable impurities. Examples of the inevitable impurities include P, S, As, Sb, Sn, Bi, etc.

It is preferable that a steel plate containing 5-10% of Ni is used as a base metal to be used for manufacturing the weld joint. When the content of Ni is less than 5%, there is, for example, a problem that cryogenic toughness cannot be secured. The content of Ni is preferably 5.2% or more, and more preferably 6.5% or more. However, when the content of Ni is more than 10%, the steel material cost increases. Therefore, the content of Ni is preferably 10% or less. The content of Ni is more preferably 9.5% or less.

EXAMPLES

In the present examples, weld metals were manufactured under the following welding conditions, using steel plates having compositions (with the remainder consisting of inevitable impurities) shown in Table 1 as base metals, electroslag welding wires having compositions shown in Tables 2 to 5, and fluxes having compositions shown in Table 6. In Tables 1 to 6 and the following Tables 7 to 10, the content of each component is designated by mass %, and "0" in each component of each composition means that the content of the component is less than a detection limit in composition analysis.

In addition, each slag amount shown in Tables 2 to 5 is an amount of a slag forming agent contained in a wire, in which a value calculated by the expression (4) based on the composition thereof is described. As tested wires, flux cored wires, MCWs, and solid wires were used. When an MCW or a solid wire was used, the used wire is described in a corresponding remarks column. When a flux cored wire was used, a corresponding remarks column is blank. In addition, whether each wire was plated with Cu or not is shown in a corresponding remarks column. The Cu plating amount was set within a range of 0.10-0.30%. The Cu amount of each wire in Tables 2 to 5 is expressed as a total of the Cu plating amount and an amount contained as an alloy in the wire excluding the Cu plating.

Further, as for each wire shown in Tables 2 to 5, if the wire does not contain any of Cu, Cr, Mo, W, Nb, V and B, only a parameter value of the relationship (1) is described, but the column of a parameter value of the relationship (2) is blank. On the other hand, as for each wire containing at least one element selected from the group consisting of Cu, Cr, Mo, W, Nb, V and B, only the parameter value of the relationship (2) is described, but the column of the parameter value of the relationship (1) is blank.

TABLE 1

| | Chemical components of base metal | | | | |
|---|---|---|---|---|---|
| Sign | C | Si | Mn | Ni | Fe |
| 9N | 0.030 | 0.25 | 0.60 | 9.50 | 89.6 |
| 7N | 0.050 | 0.22 | 0.69 | 7.32 | 91.7 |
| 5N | 0.045 | 0.24 | 0.77 | 5.33 | 93.6 |

TABLE 2

| | Chemical components of wire | | | | | | | | | | | | | | | | |
|---|---|---|---|---|---|---|---|---|---|---|---|---|---|---|---|---|---|
| | C | Si | Mn | Ni | Fe | Cu | Cr | Mo | W | Nb | V | B | Ca | Mg | REM | Zr | Al | Ti |
| No. 1 | 0.048 | 0.23 | 0.45 | 9.4 | 87 | 0 | 0 | 0 | 0 | 0 | 0 | 0 | 0 | 0 | 0 | 0 | 0 | 0 |
| No. 2 | 0.020 | 0.19 | 0.15 | 13.9 | 83 | 0 | 0 | 0 | 0 | 0 | 0 | 0 | 0.08 | 0.08 | 0.08 | 0 | 0.02 | 0 |
| No. 3 | 0.033 | 0.13 | 0.14 | 14.0 | 85 | 0 | 0 | 0 | 0 | 0 | 0 | 0 | 0 | 0 | 0 | 0 | 0 | 0 |
| No. 4 | 0.043 | 0.003 | 0.27 | 10.9 | 86 | 0 | 0 | 0 | 0 | 0 | 0 | 0 | 0 | 0 | 0 | 0 | 0 | 0 |
| No. 5 | 0.031 | 0.39 | 0.18 | 9.4 | 83 | 0 | 0 | 0 | 0 | 0 | 0 | 0 | 0 | 0 | 0 | 0 | 0 | 0 |
| No. 6 | 0.034 | 0.01 | 0.01 | 9.2 | 84 | 0 | 0 | 0 | 0 | 0 | 0 | 0 | 0 | 0 | 0 | 0 | 0 | 0 |
| No. 7 | 0.030 | 0.30 | 0.21 | 11.0 | 86 | 0 | 0 | 0 | 0 | 0 | 0 | 0 | 0 | 0 | 0 | 0 | 0 | 0 |
| No. 8 | 0.025 | 0.14 | 0.80 | 11.3 | 85 | 0 | 0 | 0 | 0 | 0 | 0 | 0 | 0 | 0 | 0 | 0 | 0 | 0 |
| No. 9 | 0.021 | 0.05 | 0.72 | 8.0 | 91 | 0 | 0 | 0 | 0 | 0 | 0 | 0 | 0 | 0 | 0 | 0 | 0 | 0 |
| No. 10 | 0.023 | 0.07 | 0.16 | 13.0 | 85 | 0 | 0 | 0 | 0 | 0 | 0 | 0 | 0 | 0 | 0 | 0 | 0 | 0 |
| No. 11 | 0.019 | 0.17 | 0.52 | 10.6 | 84 | 0 | 0 | 0 | 0 | 0 | 0 | 0 | 0 | 0 | 0 | 0 | 0 | 0 |
| No. 12 | 0.017 | 0.17 | 0.05 | 8.7 | 83 | 0 | 0 | 0 | 0 | 0 | 0 | 0 | 0 | 0 | 0 | 0 | 0 | 0 |
| No. 13 | 0.033 | 0.34 | 0.51 | 12.5 | 85 | 0 | 0 | 0 | 0 | 0 | 0 | 0 | 0 | 0 | 0 | 0 | 0 | 0 |
| No. 14 | 0.009 | 0.15 | 0.11 | 8.5 | 83 | 0 | 0 | 0 | 0 | 0 | 0 | 0.002 | 0 | 0 | 0 | 0 | 0 | 0 |
| No. 15 | 0.024 | 0.28 | 0.35 | 9.5 | 85 | 0 | 0.33 | 0.33 | 0.34 | 0 | 0 | 0.004 | 0 | 0 | 0 | 0 | 0 | 0 |

| | In wire | | | | | |
|---|---|---|---|---|---|---|
| | Parameter (1) | Parameter (2) | Parameter (3) | Slag | Parameter (4) | Remarks |
| No. 1 | 0.235 | | 0.000 | 2.8 | >100 | |
| No. 2 | 0.266 | | 0.376 | 2.4 | >100 | |
| No. 3 | 0.278 | | 0.000 | 0.6 | >100 | |
| No. 4 | 0.238 | | 0.000 | 2.7 | >100 | |
| No. 5 | 0.210 | | 0.000 | 6.9 | 3.71 | |
| No. 6 | 0.188 | | 0.000 | 6.6 | 3.71 | |
| No. 7 | 0.234 | | 0.000 | 2.4 | >100 | |
| No. 8 | 0.258 | | 0.000 | 2.6 | >100 | |
| No. 9 | 0.192 | | 0.000 | 0.1 | >100 | |
| No. 10 | 0.250 | | 0.000 | 1.6 | 10.11 | |
| No. 11 | 0.227 | | 0.000 | 4.6 | 3.71 | |
| No. 12 | 0.170 | | 0.000 | 8.0 | 1.90 | |
| No. 13 | 0.278 | | 0.000 | 1.5 | 10.11 | |
| No. 14 | | 0.171 | 0.000 | 8.1 | 1.90 | |
| No. 15 | | 0.279 | 0.000 | 3.7 | >100 | |

| | C | Si | Mn | Ni | Fe | Cu | Cr | Mo | W | Nb | V | B | Ca | Mg | REM | Zr | Al | Ti |
|---|---|---|---|---|---|---|---|---|---|---|---|---|---|---|---|---|---|---|
| No. 16 | 0.042 | 0.16 | 0.04 | 9.0 | 86 | 0 | 0 | 0.45 | 0 | 0 | 0 | 0 | 0 | 0 | 0 | 0 | 0 | 0 |
| No. 17 | 0.040 | 0.17 | 0.20 | 10.2 | 84 | 0 | 0.47 | 0 | 0 | 0 | 0 | 0 | 0 | 0 | 0 | 0 | 0 | 0 |
| No. 18 | 0.007 | 0.18 | 0.01 | 11.0 | 85 | 0 | 0 | 0 | 0.48 | 0 | 0 | 0 | 0 | 0 | 0 | 0 | 0 | 0 |
| No. 19 | 0.006 | 0.02 | 0.21 | 10.4 | 87 | 0.42 | 0 | 0 | 0 | 0 | 0 | 0 | 0 | 0 | 0 | 0 | 0 | 0 |
| No. 20 | 0.016 | 0.12 | 0.15 | 10.5 | 84 | 0 | 0 | 0 | 0 | 0 | 0 | 0 | 0.05 | 0.04 | 0 | 0 | 0 | 0 |
| No. 21 | 0.049 | 0.11 | 0.09 | 11.5 | 87 | 0 | 0 | 0 | 0 | 0 | 0 | 0 | 0 | 0.08 | 0 | 0 | 0.04 | 0 |
| No. 22 | 0.046 | 0.12 | 0.10 | 11.4 | 88 | 0 | 0 | 0 | 0 | 0 | 0 | 0 | 0.08 | 0.08 | 0.06 | 0 | 0.02 | 0 |
| No. 23 | 0.013 | 0.09 | 0.09 | 11.7 | 88 | 0 | 0 | 0 | 0 | 0 | 0 | 0 | 0 | 0 | 0.03 | 0 | 0 | 0.02 |
| No. 24 | 0.044 | 0.28 | 0.08 | 9.7 | 86 | 0 | 0 | 0 | 0 | 0 | 0 | 0 | 0.08 | 0.10 | 0.09 | 0 | 0 | 0 |
| No. 25 | 0.012 | 0.15 | 0.07 | 13.4 | 82 | 0 | 0 | 0 | 0 | 0 | 0 | 0 | 0.08 | 0.09 | 0.08 | 0 | 0.08 | 0 |

| | In wire | | | | | |
|---|---|---|---|---|---|---|
| | Parameter (1) | Parameter (2) | Parameter (3) | Slag | Parameter (4) | Remarks |
| No. 16 | | 0.229 | 0.000 | 4.2 | 1.90 | |
| No. 17 | | 0.249 | 0.000 | 4.8 | 1.90 | |
| No. 18 | | 0.213 | 0.000 | 3.2 | >100 | |
| No. 19 | | 0.212 | 0.000 | 1.8 | >100 | Cu plated wire |
| No. 20 | 0.203 | | 0.144 | 5.0 | 3.71 | |
| No. 21 | 0.249 | | 0.168 | 1.0 | >100 | |
| No. 22 | 0.245 | | 0.351 | 0.0 | — | MCW |

TABLE 2-continued

|        |       |       |     |      |       |
|--------|-------|-------|-----|------|-------|
| No. 23 | 0.216 | 0.054 | 0.0 | —    | Solid |
| No. 24 | 0,219 | 0.401 | 3.5 | >100 |       |
| No. 25 | 0.244 | 0.452 | 3.9 | >100 |       |

TABLE 3

Chemical components of wire

|        | C     | Si   | Mn   | Ni   | Fe | Cu   | Cr   | Mo   | W    | Nb | V | B     | Ca   | Mg   | REM  | Zr   | Al   | Ti   |
|--------|-------|------|------|------|----|------|------|------|------|----|---|-------|------|------|------|------|------|------|
| No. 26 | 0.022 | 0.17 | 0.14 | 13.4 | 82 | 0    | 0    | 0    | 0    | 0  | 0 | 0     | 0    | 0.08 | 0    | 0.11 | 0.20 | 0    |
| No. 27 | 0.027 | 0.21 | 0.11 | 10.9 | 87 | 0    | 0    | 0    | 0    | 0  | 0 | 0     | 0.20 | 0    | 0.20 | 0    | 0    | 0.03 |
| No. 28 | 0.021 | 0.20 | 0.13 | 11.0 | 84 | 0    | 0    | 0    | 0    | 0  | 0 | 0     | 0.04 | 0.20 | 0.04 | 0    | 0.02 | 0    |
| No. 29 | 0.024 | 0.18 | 0.21 | 11.5 | 86 | 0    | 0    | 0    | 0    | 0  | 0 | 0     | 0    | 0    | 0    | 0    | 0.11 | 0    |
| No. 30 | 0.028 | 0.08 | 0.14 | 10.8 | 87 | 0    | 0    | 0    | 0    | 0  | 0 | 0     | 0.08 | 0    | 0.07 | 0    | 0    | 0    |
| No. 31 | 0.019 | 0.10 | 0.18 | 9.8  | 86 | 0    | 0    | 0    | 0    | 0  | 0 | 0     | 0    | 0.12 | 0    | 0    | 0    | 0    |
| No. 32 | 0.017 | 0.14 | 0.15 | 11.0 | 86 | 0    | 0.35 | 0.34 | 0.36 | 0  | 0 | 0.002 | 0.08 | 0.08 | 0.07 | 0    | 0.03 | 0    |
| No. 33 | 0.008 | 0.04 | 0.13 | 8.8  | 83 | 0    | 0    | 0.12 | 0    | 0  | 0 | 0     | 0.07 | 0    | 0.07 | 0    | 0    | 0.09 |
| No. 34 | 0.008 | 0.07 | 0.14 | 8.7  | 84 | 0    | 0    | 0    | 0.04 | 0  | 0 | 0.005 | 0.11 | 0.09 | 0.12 | 0    | 0.12 | 0    |
| No. 35 | 0.022 | 0.18 | 0.15 | 13.0 | 84 | 0    | 0    | 0.34 | 0    | 0  | 0 | 0     | 0    | 0.04 | 0    | 0    | 0.04 | 0    |
| No. 36 | 0.024 | 0.21 | 0.14 | 13.3 | 85 | 0    | 0.35 | 0    | 0    | 0  | 0 | 0     | 0.16 | 0.15 | 0.16 | 0    | 0    | 0    |
| No. 37 | 0.021 | 0.22 | 0.15 | 11.9 | 87 | 0    | 0.25 | 0    | 0    | 0  | 0 | 0     | 0.15 | 0.10 | 0    | 0    | 0.08 | 0    |
| No. 38 | 0.013 | 0.04 | 0.06 | 9.6  | 90 | 0.15 | 0    | 0    | 0    | 0  | 0 | 0.003 | 0    | 0    | 0.03 | 0    | 0    | 0.02 |

In wire

|        | Parameter (1) | Parameter (2) | Parameter (3) | Slag | Parameter (4) | Remarks              |
|--------|---------------|---------------|---------------|------|---------------|----------------------|
| No. 26 | 0.258         |               | 0.466         | 3.8  | >100          |                      |
| No. 27 | 0.221         |               | 0.594         | 1.2  | >100          |                      |
| No. 28 | 0.218         |               | 0.454         | 4.2  | 10.11         |                      |
| No. 29 | 0.232         |               | 0.110         | 1.9  | >100          |                      |
| No. 30 | 0.218         |               | 0.216         | 1.7  | >100          |                      |
| No. 31 | 0.195         |               | 0.192         | 3.7  | >100          |                      |
| No. 32 |               | 0.275         | 0.374         | 1.3  | >100          |                      |
| No. 33 |               | 0.171         | 0.272         | 7.6  | 10.11         |                      |
| No. 34 |               | 0.189         | 0.590         | 6.5  | 15.00         |                      |
| No. 35 |               | 0.275         | 0.104         | 2.1  | >100          |                      |
| No. 36 |               | 0.277         | 0.696         | 0.4  | >100          |                      |
| No. 37 |               | 0.247         | 0.480         | 0.0  | —             | MCW                  |
| No. 38 |               | 0.200         | 0.054         | 0.0  | —             | Solid, Cu plated wire |

|        | C     | Si   | Mn   | Ni   | Fe | Cu | Cr   | Mo   | W    | Nb   | V    | B | Ca   | Mg   | REM  | Zr | Al   | Ti |
|--------|-------|------|------|------|----|----|------|------|------|------|------|---|------|------|------|----|------|----|
| No. 39 | 0.008 | 0.07 | 0.15 | 10.8 | 88 | 0  | 0    | 0    | 0    | 0    | 0    | 0 | 0.12 | 0.08 | 0.10 | 0  | 0.13 | 0  |
| No. 40 | 0.022 | 0.18 | 0.13 | 11.0 | 87 | 0  | 0.25 | 0    | 0    | 0    | 0    | 0 | 0.11 | 0.07 | 0.12 | 0  | 0.14 | 0  |
| No. 41 | 0.027 | 0.07 | 0.12 | 11.3 | 88 | 0  | 0    | 0    | 0    | 0    | 0    | 0 | 0    | 0    | 0    | 0  | 0    | 0  |
| No. 42 | 0.022 | 0.09 | 0.15 | 12.8 | 86 | 0  | 0    | 0.05 | 0.10 | 0    | 0    | 0 | 0    | 0    | 0    | 0  | 0    | 0  |
| No. 43 | 0.031 | 0.10 | 0.09 | 8.2  | 83 | 0  | 0    | 0    | 0    | 0    | 0    | 0 | 0.08 | 0.08 | 0.07 | 0  | 0.03 | 0  |
| No. 44 | 0.018 | 0.06 | 0.09 | 8.1  | 82 | 0  | 0    | 0    | 0    | 0.05 | 0.05 | 0 | 0    | 0    | 0    | 0  | 0    | 0  |
| No. 45 | 0.019 | 0.08 | 0.07 | 9.6  | 88 | 0  | 0    | 0    | 0    | 0    | 0    | 0 | 0.08 | 0.09 | 0.08 | 0  | 0.08 | 0  |
| No. 46 | 0.013 | 0.15 | 0.18 | 9.8  | 87 | 0  | 0    | 0    | 0    | 0    | 0    | 0 | 0.08 | 0.09 | 0.08 | 0  | 0.08 | 0  |
| No. 47 | 0.003 | 0.14 | 0.32 | 8.7  | 85 | 0  | 0    | 0    | 0    | 0    | 0    | 0 | 0    | 0    | 0    | 0  | 0    | 0  |
| No. 48 | 0.011 | 0.18 | 0.07 | 8.5  | 87 | 0  | 0    | 0    | 0    | 0    | 0    | 0 | 0    | 0    | 0    | 0  | 0    | 0  |
| No. 49 | 0.047 | 0.37 | 0.58 | 12.1 | 84 | 0  | 0    | 0    | 0    | 0    | 0    | 0 | 0    | 0    | 0    | 0  | 0    | 0  |
| No. 50 | 0.009 | 0.19 | 0.13 | 8.2  | 87 | 0  | 0    | 0    | 0    | 0    | 0    | 0 | 0    | 0    | 0    | 0  | 0    | 0  |

In wire

|        | Parameter (1) | Parameter (2) | Parameter (3) | Slag | Parameter (4) | Remarks |
|--------|---------------|---------------|---------------|------|---------------|---------|
| No. 39 | 0.198         |               | 0.575         | 0.4  | 1.30          |         |
| No. 40 |               | 0.230         | 0.578         | 0.9  | 1.30          |         |
| No. 41 | 0.224         |               | 0.000         | 0.4  | 1.30          |         |
| No. 42 |               | 0.253         | 0.000         | 0.7  | 1.30          |         |
| No. 43 | 0.176         |               | 0.374         | 8.2  | 10.11         |         |
| No. 44 | 0.160         |               | 0.000         | 9.6  | 3.71          |         |
| No. 45 |               | 0.195         | 0.452         | 1.7  | >100          |         |
| No. 46 | 0.190         |               | 0.452         | 2.4  | >100          |         |
| No. 47 | 0.169         |               | 0.000         | 5.7  | 10.11         |         |
| No. 48 | 0.162         |               | 0.000         | 4.1  | 15.00         |         |
| No. 49 | 0.290         |               | 0.000         | 2.8  | >100          |         |
| No. 50 |               | 0.161         | 0.000         | 4.4  | 1.90          |         |

TABLE 4

Chemical components of wire

| | C | Si | Mn | Ni | Fe | Cu | Cr | Mo | W | Nb | V | B | Ca | Mg | REM | Zr | Al | Ti |
|---|---|---|---|---|---|---|---|---|---|---|---|---|---|---|---|---|---|---|
| No. 51 | 0.036 | 0.36 | 0.45 | 10.1 | 84 | 0.14 | 0 | 0 | 0.05 | 0.20 | 0.20 | 0 | 0 | 0 | 0 | 0 | 0 | 0 |
| No. 52 | 0.004 | 0.18 | 0.15 | 8.7 | 85 | 0 | 0.04 | 0 | 0 | 0 | 0 | 0 | 0 | 0 | 0 | 0 | 0 | 0 |
| No. 53 | 0.022 | 0.13 | 0.35 | 10.8 | 87 | 0 | 0 | 0 | 0 | 0 | 0 | 0 | 0.01 | 0 | 0 | 0 | 0 | 0 |
| No. 54 | 0.014 | 0.24 | 0.30 | 8.9 | 86 | 0 | 0 | 0 | 0 | 0 | 0 | 0 | 0 | 0.02 | 0 | 0 | 0 | 0 |
| No. 55 | 0.020 | 0.24 | 0.27 | 10.9 | 84 | 0 | 0 | 0 | 0 | 0 | 0 | 0 | 0 | 0 | 0.02 | 0 | 0 | 0 |
| No. 56 | 0.046 | 0.08 | 0.06 | 9.1 | 85 | 0 | 0 | 0 | 0 | 0 | 0 | 0 | 0 | 0 | 0 | 0.03 | 0 | 0 |
| No. 57 | 0.018 | 0.26 | 0.21 | 11.1 | 87 | 0 | 0 | 0 | 0 | 0 | 0 | 0 | 0 | 0 | 0 | 0 | 0.03 | 0 |
| No. 58 | 0.008 | 0.10 | 0.18 | 9.3 | 86 | 0 | 0 | 0 | 0 | 0 | 0 | 0 | 0 | 0 | 0 | 0 | 0 | 0.02 |
| No. 59 | 0.039 | 0.29 | 0.12 | 9.5 | 85 | 0 | 0 | 0 | 0 | 0 | 0 | 0 | 0 | 0.04 | 0.03 | 0 | 0 | 0 |
| No. 60 | 0.019 | 0.15 | 0.18 | 11.0 | 86 | 0 | 0.05 | 0 | 0 | 0 | 0 | 0.004 | 0.01 | 0 | 0.01 | 0 | 0 | 0 |
| No. 61 | 0.028 | 0.13 | 0.12 | 11.3 | 85 | 0 | 0 | 0 | 0.35 | 0 | 0 | 0 | 0 | 0.01 | 0 | 0 | 0 | 0 |
| No. 62 | 0.052 | 0.008 | 0.03 | 8.4 | 90 | 0 | 0 | 0 | 0 | 0 | 0 | 0 | 0 | 0 | 0 | 0 | 0 | 0 |
| No. 63 | 0.069 | 0.003 | 0.16 | 11.5 | 86 | 0 | 0 | 0 | 0 | 0 | 0 | 0 | 0 | 0 | 0 | 0 | 0 | 0 |
| No. 64 | 0.032 | 0.50 | 0.21 | 11.6 | 87 | 0 | 0 | 0 | 0 | 0 | 0 | 0 | 0 | 0 | 0 | 0 | 0 | 0 |

| | Parameter (1) | Parameter (2) | Parameter (3) | Slag | In wire Parameter (4) | Remarks |
|---|---|---|---|---|---|---|
| No. 51 | | 0.288 | 0.000 | 4.4 | 15.00 | Cu plated wire |
| No. 52 | | 0.165 | 0.000 | 5.8 | 1.14 | |
| No. 53 | 0.224 | | 0.016 | 1.6 | >100 | |
| No. 54 | 0.185 | | 0.032 | 4.4 | 3.71 | |
| No. 55 | 0.223 | | 0.025 | 4.5 | 1.14 | |
| No. 56 | 0.203 | | 0.038 | 5.6 | 10.11 | |
| No. 57 | 0.222 | | 0.030 | 1.3 | >100 | |
| No. 58 | 0.175 | | 0.016 | 4.3 | 1.90 | |
| No. 59 | 0.213 | | 0.102 | 4.9 | 1.14 | |
| No. 60 | | 0.239 | 0.029 | 2.5 | >100 | |
| No. 61 | | 0.238 | 0.016 | 3.0 | >100 | |
| No. 62 | 0.194 | | 0.000 | 1.4 | >100 | |
| No. 63 | 0.269 | | 0.000 | 2.2 | >100 | |
| No. 64 | 0.253 | | 0.000 | 0.6 | >100 | |

| | C | Si | Mn | Ni | Fe | Cu | Cr | Mo | W | Nb | V | B | Ca | Mg | REM | Zr | Al | Ti |
|---|---|---|---|---|---|---|---|---|---|---|---|---|---|---|---|---|---|---|
| No. 65 | 0.036 | 0.22 | 0.93 | 7.7 | 88 | 0 | 0 | 0 | 0 | 0 | 0 | 0 | 0 | 0 | 0 | 0 | 0 | 0 |
| No. 66 | 0.027 | 0.06 | 1.00 | 12.7 | 86 | 0 | 0 | 0 | 0 | 0 | 0 | 0 | 0 | 0 | 0 | 0 | 0 | 0 |
| No. 67 | 0.033 | 0.15 | 0.29 | 6.0 | 93 | 0 | 0 | 0 | 0 | 0 | 0 | 0 | 0 | 0 | 0 | 0 | 0 | 0 |
| No. 68 | 0.011 | 0.16 | 0.17 | 15.0 | 84 | 0 | 0 | 0 | 0 | 0 | 0 | 0 | 0 | 0 | 0 | 0 | 0 | 0 |
| No. 69 | 0.017 | 0.15 | 0.78 | 9.9 | 79 | 0 | 0 | 0 | 0 | 0 | 0 | 0 | 0 | 0 | 0 | 0 | 0 | 0 |
| No. 70 | 0.006 | 0.09 | 0.07 | 8.3 | 84 | 0 | 0 | 0 | 0 | 0 | 0 | 0 | 0 | 0 | 0 | 0 | 0 | 0 |
| No. 71 | 0.046 | 0.29 | 0.75 | 12.4 | 83 | 0 | 0 | 0 | 0 | 0 | 0 | 0 | 0 | 0 | 0 | 0 | 0 | 0 |
| No. 72 | 0.005 | 0.04 | 0.06 | 8.4 | 83 | 0 | 0 | 0 | 0.04 | 0.03 | 0 | 0 | 0 | 0 | 0 | 0 | 0 | 0 |
| No. 73 | 0.028 | 0.33 | 0.48 | 11.3 | 83 | 0.25 | 0 | 0.51 | 0 | 0 | 0 | 0 | 0 | 0 | 0 | 0 | 0 | 0 |
| No. 74 | 0.027 | 0.12 | 0.66 | 10.7 | 87 | 0.25 | 0 | 0 | 0 | 0 | 0 | 0.008 | 0 | 0 | 0 | 0 | 0 | 0 |
| No. 75 | 0.005 | 0.17 | 0.19 | 10.1 | 86 | 0 | 0 | 0 | 0 | 0 | 0 | 0 | 0.0007 | 0 | 0 | 0 | 0 | 0 |

| | Parameter (1) | Parameter(2) | Parameter (3) | Slag | In wire Parameter (4) | Remarks |
|---|---|---|---|---|---|---|
| No. 65 | 0.218 | | 0.000 | 3.0 | 10.11 | |
| No. 66 | 0.291 | | 0.000 | 0.1 | >100 | |
| No. 67 | 0.153 | | 0.000 | 0.4 | >100 | |
| No. 68 | 0.275 | | 0.000 | 0.6 | >100 | |
| No. 69 | 0.226 | | 0.000 | 10.1 | 1.14 | |
| No. 70 | 0.151 | | 0.000 | 7.4 | 1.90 | |
| No. 71 | 0.300 | | 0.000 | 3.4 | >100 | |
| No. 72 | | 0.154 | 0.000 | 8.3 | 15.00 | |
| No. 73 | | 0.298 | 0.000 | 4.0 | 1.90 | Cu plated wire |
| No. 74 | | 0.295 | 0.000 | 1.1 | >100 | |
| No. 75 | 0.189 | | 0.001 | 3.4 | >100 | |

TABLE 5

Chemical components of wire

| | C | Si | Mn | Ni | Fe | Cu | Cr | Mo | W | Nb | V | B | Ca | Mg | REM | Zr | Al | Ti |
|---|---|---|---|---|---|---|---|---|---|---|---|---|---|---|---|---|---|---|
| No. 76 | 0.018 | 0.05 | 0.09 | 9.9 | 86 | 0 | 0 | 0 | 0 | 0 | 0 | 0 | 0.0007 | 0 | 0 | 0 | 0 | 0 |
| No. 77 | 0.026 | 0.21 | 0.11 | 10.3 | 87 | 0 | 0 | 0 | 0 | 0 | 0 | 0 | 0 | 0.004 | 0 | 0 | 0 | 0 |
| No. 78 | 0.041 | 0.19 | 0.42 | 8.5 | 86 | 0 | 0 | 0 | 0 | 0 | 0 | 0 | 0 | 0 | 0.005 | 0 | 0 | 0 |
| No. 79 | 0.029 | 0.20 | 0.18 | 10.0 | 84 | 0 | 0 | 0 | 0 | 0 | 0 | 0 | 0 | 0 | 0 | 0.006 | 0 | 0 |
| No. 80 | 0.025 | 0.10 | 0.26 | 10.3 | 85 | 0 | 0 | 0 | 0 | 0 | 0 | 0 | 0 | 0 | 0 | 0 | 0.008 | 0 |

TABLE 5-continued

Chemical components of wire

| | | | | | | | | | | | | | | | | | | | |
|---|---|---|---|---|---|---|---|---|---|---|---|---|---|---|---|---|---|---|---|
| No. 81 | 0.043 | 0.19 | 0.45 | 9.9 | 85 | 0 | 0 | 0 | 0 | 0 | 0 | 0 | 0.13 | 0.12 | 0.15 | 0 | 0.12 | 0.03 |
| No. 82 | 0.019 | 0.15 | 0.18 | 10.8 | 87 | 0.25 | 0 | 0 | 0 | 0 | 0 | 0 | 0.13 | 0.12 | 0.15 | 0 | 0.14 | 0 |
| No. 83 | 0.021 | 0.19 | 0.15 | 11.5 | 87 | 0 | 0 | 0 | 0 | 0 | 0 | 0 | 0.11 | 0.09 | 0.12 | 0 | 0.12 | 0 |
| No. 84 | 0.022 | 0.18 | 0.23 | 11.5 | 87 | 0 | 0.25 | 0 | 0 | 0 | 0 | 0 | 0.11 | 0.09 | 0.12 | 0 | 0.12 | 0 |
| No. 85 | 0.022 | 0.08 | 0.14 | 11.5 | 88 | 0 | 0 | 0 | 0 | 0 | 0 | 0 | 0 | 0 | 0 | 0 | 0 | 0 |
| No. 86 | 0.022 | 0.08 | 0.18 | 11.3 | 88 | 0 | 0 | 0.10 | 0 | 0 | 0 | 0.002 | 0 | 0 | 0 | 0 | 0 | 0 |
| No. 87 | 0.048 | 0.03 | 0.03 | 5.0 | 79 | 0 | 0 | 0 | 0 | 0 | 0 | 0 | 0 | 0 | 0 | 0 | 0 | 0 |
| No. 88 | 0.016 | 0.04 | 0.39 | 7.0 | 92 | 0 | 0 | 0 | 0 | 0 | 0 | 0 | 0 | 0 | 0 | 0 | 0 | 0 |
| No. 89 | 0.018 | 0.14 | 0.35 | 10.5 | 83 | 0 | 0 | 0 | 0 | 0 | 0 | 0 | 0.08 | 0 | 0.07 | 0 | 0 | 0 |

| | Parameter (1) | Parameter (2) | Parameter (3) | Slag | In wire Parameter (4) | Remarks |
|---|---|---|---|---|---|---|
| No. 76 | 0.189 | | 0.001 | 3.8 | >100 | |
| No. 77 | 0.210 | | 0.005 | 2.3 | >100 | |
| No. 78 | 0.210 | | 0.006 | 4.7 | 3.71 | |
| No. 79 | 0.211 | | 0.006 | 5.5 | 10.11 | |
| No. 80 | 0.213 | | 0.006 | 4.2 | 1.90 | |
| No. 81 | 0.237 | | 0.732 | 3.8 | >100 | |
| No. 82 | 0.213 | | 0.728 | 1.0 | 15.00 | |
| No. 83 | 0.227 | | 0.590 | 0.6 | 0.54 | |
| No. 84 | | 0.244 | 0.590 | 0.3 | 0.54 | |
| No. 85 | 0.223 | | 0.000 | 0.2 | 0.54 | |
| No. 86 | | 0.239 | 0.000 | 0.2 | 0.54 | |
| No. 87 | 0.151 | | 0.000 | 14.8 | 10.11 | |
| No. 88 | 0.154 | | 0.000 | 0.5 | >100 | |
| No. 89 | 0.215 | | 0.216 | 5.7 | 1.36 | Containing carbonate in wire flux |

| | C | Si | Mn | Ni | Fe | Cu | Cr | Mo | W | Nb | V | B | Ca | Mg | REM | Zr | Al | Ti |
|---|---|---|---|---|---|---|---|---|---|---|---|---|---|---|---|---|---|---|
| No. 90 | 0.013 | 0.04 | 0.11 | 8.8 | 83 | 0 | 0.25 | 0 | 0 | 0 | 0 | 0 | 0.08 | 0 | 0.07 | 0 | 0 | 0 |
| No. 91 | 0.081 | 0.09 | 0.38 | 6.8 | 88 | 0 | 0 | 0 | 0 | 0 | 0 | 0 | 0 | 0 | 0 | 0 | 0 | 0 |
| No. 92 | 0.033 | 0.55 | 0.09 | 12.5 | 86 | 0 | 0 | 0 | 0 | 0 | 0 | 0 | 0 | 0 | 0 | 0 | 0 | 0 |
| No. 93 | 0.038 | 0.09 | 1.30 | 7.5 | 90 | 0 | 0 | 0 | 0 | 0 | 0 | 0 | 0 | 0 | 0 | 0 | 0 | 0 |
| No. 94 | 0.036 | 0.31 | 0.33 | 5.5 | 92 | 0 | 0 | 0 | 0 | 0 | 0 | 0 | 0 | 0 | 0 | 0 | 0 | 0 |
| No. 95 | 0.021 | 0.13 | 0.13 | 15.7 | 83 | 0 | 0 | 0 | 0 | 0 | 0 | 0 | 0 | 0 | 0 | 0 | 0 | 0 |
| No. 96 | 0.038 | 0.14 | 0.57 | 13.5 | 75 | 0 | 0 | 0 | 0 | 0 | 0 | 0 | 0 | 0 | 0 | 0 | 0 | 0 |
| No. 97 | 0.004 | 0.01 | 0.02 | 8.1 | 84 | 0 | 0 | 0 | 0 | 0 | 0 | 0 | 0 | 0 | 0 | 0 | 0 | 0 |
| No. 98 | 0.048 | 0.38 | 0.77 | 12.6 | 83 | 0 | 0 | 0 | 0 | 0 | 0 | 0 | 0 | 0 | 0 | 0 | 0 | 0 |
| No. 99 | 0.004 | 0.01 | 0.02 | 8.1 | 83 | 0 | 0 | 0.04 | 0 | 0 | 0 | 0 | 0 | 0 | 0 | 0 | 0 | 0 |
| No. 100 | 0.037 | 0.31 | 0.43 | 11.1 | 84 | 0.25 | 0.41 | 0 | 0 | 0.13 | 0.13 | 0 | 0 | 0 | 0 | 0 | 0 | 0 |

| | Parameter (1) | Parameter (2) | Parameter (3) | Slag | In wire Parameter (4) | Remarks |
|---|---|---|---|---|---|---|
| No. 90 | | 0.179 | 0.216 | 7.5 | 1.36 | Containing carbonate in wire flux |
| No. 91 | 0.216 | | 0.000 | 4.5 | 1.90 | |
| No. 92 | 0.264 | | 0.000 | 0.7 | >100 | |
| No. 93 | 0.231 | | 0.000 | 1.0 | >100 | |
| No. 94 | 0.155 | | 0.000 | 1.7 | >100 | |
| No. 95 | 0.294 | | 0.000 | 0.9 | >100 | |
| No. 96 | 0.296 | | 0.000 | 10.7 | 1.30 | |
| No. 97 | 0.140 | | 0.000 | 7.8 | 1.90 | |
| No. 98 | 0.309 | | 0.000 | 3.1 | >100 | |
| No. 99 | | 0.143 | 0.000 | 8.7 | 1.90 | |
| No. 100 | | 0.313 | 0.000 | 3.1 | >100 | Cu plated wire |

TABLE 6

| | | Flux | | | | | | | | | | | | | |
|---|---|---|---|---|---|---|---|---|---|---|---|---|---|---|---|
| Parameter (5) | Flux sign | CaO | CaF$_2$ | BaF$_2$ | MgO | BaO | Na$_2$O | K$_2$O | SiO$_2$ | Al$_2$O$_3$ | TiO$_2$ | ZrO$_2$ | MnO | FeO | |
| | MIN | 5 | 3 | 0 | 0 | 0 | 0 | 0 | 0 | 0 | 0 | 0 | 0 | 0 | |
| | MAX | 60 | 50 | 20 | 20 | 20 | 10 | 10 | 35 | 55 | 10 | 10 | 20 | 5 | TOTAL |
| 1.02 | A | 20 | 12 | 0 | 4 | 2 | 3 | 3 | 30 | 3 | 3 | 0 | 19 | 1 | 100 |
| 1.33 | B | 23 | 8 | 5 | 12 | 0 | 3 | 3 | 35 | 3 | 0 | 4 | 4 | 0 | 100 |
| 1.90 | C | 45 | 9 | 0 | 6 | 0 | 0 | 0 | 23 | 3 | 2 | 0 | 10 | 2 | 100 |
| 3.13 | D | 49 | 3 | 0 | 0 | 0 | 9 | 0 | 0 | 21 | 9 | 0 | 0 | 0 | 100 |
| 3.71 | E | 35 | 30 | 0 | 0 | 0 | 0 | 0 | 35 | 0 | 0 | 0 | 0 | 0 | 100 |
| 2.44 | F | 6 | 49 | 0 | 0 | 0 | 0 | 0 | 45 | 0 | 0 | 0 | 0 | 0 | 100 |
| 1.64 | G | 10 | 25 | 0 | 0 | 0 | 10 | 0 | 55 | 0 | 0 | 0 | 0 | 0 | 100 |
| 6.00 | H | 5 | 10 | 20 | 20 | 20 | 0 | 0 | 0 | 0 | 0 | 0 | 20 | 5 | 100 |

TABLE 6-continued

| | | | | | | | | | Flux | | | | | | |
|---|---|---|---|---|---|---|---|---|---|---|---|---|---|---|---|
| Parameter (5) | Flux sign MIN MAX | CaO 5 60 | CaF₂ 3 50 | BaF₂ 0 20 | MgO 0 20 | BaO 0 20 | Na₂O 0 10 | K₂O 0 10 | SiO₂ 0 35 | Al₂O₃ 0 55 | TiO₂ 0 10 | ZrO₂ 0 10 | MnO 0 20 | FeO 0 5 | TOTAL |
| 1.30 | I | 30 | 10 | 0 | 0 | 10 | 0 | 0 | 27 | 20 | 0 | 3 | 0 | 0 | 100 |
| 1.36 | J | 30 | 10 | 0 | 6 | 5 | 0 | 0 | 26 | 20 | 0 | 3 | 0 | 0 | 100 |
| 9.76 | K | 60 | 10 | 5 | 8 | 0 | 0 | 0 | 0 | 17 | 0 | 0 | 0 | 0 | 100 |
| 1.08 | L | 10 | 25 | 0 | 0 | 0 | 0 | 0 | 0 | 65 | 0 | 0 | 0 | 0 | 100 |

In addition, as shown in FIG. 1, welding was performed on a 20° V-groove with a groove width of 10 mm surrounded by a copper backing 1 (on the back side of the groove) and a sliding copper backing 2 (on the front side of the groove). A water-cooled backing was used as each of the copper backing 1 and the sliding copper backing 2.

welding method: electroslag welding
welding conditions:
plate thickness of base metal: 30 mm
groove shape: see FIG. 1
  welding started at slag bath depth of 25 mm
wire: see Tables 2 to 5
wire diameter=1.6 mm
heat input condition: about 12-19 kJ/mm (welding current 340-380 A, welding voltage 40-44 V)
welding posture: vertical one pass Compositions (with the remainder consisting of inevitable impurities) of weld metals obtained thus are shown in Tables 7 to 10. As for each weld metal shown in Tables 7 to 10, if the weld metal does not contain any of Cu, Cr, Mo, W, Nb, V and B, only a parameter value of the relationship (6) is set out, but the column of a parameter value of the relationship (7) is blank. On the other hand, as for each weld metal containing at least one element selected from the group consisting of Cu, Cr, Mo, W, Nb, V and B, only the parameter value of the relationship (7) is set out, but the column of the parameter value of the relationship (6) is blank. Further, the aforementioned weld metals were evaluated as to the following properties.

(Strength)

A tensile test piece was extracted from a central portion of each weld metal and in parallel with a weld line direction by a method according to JIS Z2202, and a tensile test was performed thereon by a method according to JIS Z2241. In each example, when the weld metal satisfied tensile strength TS>690 MPa, it was evaluated as acceptable.

(Cryogenic Toughness)

A charpy impact test piece (JIS Z3111 No. 4 V-notch test piece) was extracted from a plate-thickness-direction central portion of each obtained weld metal and perpendicularly to a weld line direction, and a charpy impact test at −196° C. was performed thereon by a method according to JIS Z2242. Similar tests were performed three times, and an average value thereof was calculated. When the weld metal had an absorbed energy IV of 40 J or more, it was evaluated as excellent in cryogenic toughness.

(Bead Appearance)

Bead appearance was checked visually, and evaluated on the basis of the following criteria.
  acceptable: bead with edge uniform and excellent in linearity
  rejected: bead meandered largely or with undercut occurring therein

TABLE 7

Chemical components and mechanical properties of weld metal

| | C | Si | Mn | Ni | Fe | Cu | Cr | Mo | W | Nb | V | B | O | N |
|---|---|---|---|---|---|---|---|---|---|---|---|---|---|---|
| No. 1 | 0.049 | 0.19 | 0.49 | 9.3 | 90 | 0 | 0 | 0 | 0 | 0 | 0 | 0 | 0.022 | 0.0041 |
| No. 2 | 0.031 | 0.17 | 0.30 | 10.5 | 89 | 0 | 0 | 0 | 0 | 0 | 0 | 0 | 0.013 | 0.0033 |
| No. 3 | 0.038 | 0.14 | 0.30 | 8.5 | 91 | 0 | 0 | 0 | 0 | 0 | 0 | 0 | 0.020 | 0.0043 |
| No. 4 | 0.047 | 0.07 | 0.38 | 8.6 | 91 | 0 | 0 | 0 | 0 | 0 | 0 | 0 | 0.020 | 0.0035 |
| No. 5 | 0.039 | 0.29 | 0.33 | 9.8 | 90 | 0 | 0 | 0 | 0 | 0 | 0 | 0 | 0.021 | 0.0039 |
| No. 6 | 0.041 | 0.07 | 0.11 | 9.7 | 90 | 0 | 0 | 0 | 0 | 0 | 0 | 0 | 0.021 | 0.0040 |
| No. 7 | 0.039 | 0.23 | 0.34 | 10.6 | 89 | 0 | 0 | 0 | 0 | 0 | 0 | 0 | 0.022 | 0.0035 |
| No. 8 | 0.034 | 0.15 | 0.76 | 10.8 | 88 | 0 | 0 | 0 | 0 | 0 | 0 | 0 | 0.023 | 0.0029 |
| No. 9 | 0.031 | 0.09 | 0.69 | 7.1 | 92 | 0 | 0 | 0 | 0 | 0 | 0 | 0 | 0.023 | 0.0035 |
| No. 10 | 0.033 | 0.12 | 0.31 | 11.8 | 88 | 0 | 0 | 0 | 0 | 0 | 0 | 0 | 0.021 | 0.0036 |
| No. 11 | 0.031 | 0.15 | 0.55 | 10.2 | 89 | 0 | 0 | 0 | 0 | 0 | 0 | 0 | 0.020 | 0.0045 |
| No. 12 | 0.028 | 0.16 | 0.26 | 9.5 | 90 | 0 | 0 | 0 | 0 | 0 | 0 | 0 | 0.025 | 0.0034 |
| No. 13 | 0.038 | 0.24 | 0.55 | 11.5 | 88 | 0 | 0 | 0 | 0 | 0 | 0 | 0 | 0.020 | 0.0039 |
| No. 14 | 0.023 | 0.16 | 0.29 | 9.1 | 90 | 0 | 0 | 0 | 0 | 0 | 0 | 0.001 | 0.024 | 0.0033 |
| No. 15 | 0.033 | 0.22 | 0.43 | 9.5 | 89 | 0 | 0.22 | 0.23 | 0.23 | 0 | 0 | 0.003 | 0.020 | 0.0033 |
| No. 16 | 0.045 | 0.16 | 0.23 | 9.4 | 90 | 0 | 0 | 0.30 | 0 | 0 | 0 | 0 | 0.025 | 0.0031 |
| No. 17 | 0.043 | 0.17 | 0.35 | 10.3 | 89 | 0 | 0.31 | 0 | 0 | 0 | 0 | 0 | 0.024 | 0.0045 |

| | Base metal | Flux sign | Parameter (6) | Parameter (7) | Tensile strength (MPa) | Absorbed energy (J) |
|---|---|---|---|---|---|---|
| No. 1 | 9N | E | 0.235 | | 810 | 56 |
| No. 2 | 7N | B | 0.227 | | 823 | 65 |
| No. 3 | 5N | E | 0.199 | | 714 | 55 |
| No. 4 | 7N | D | 0.212 | | 727 | 59 |
| No. 5 | 9N | K | 0.229 | | 828 | 58 |

TABLE 7-continued

Chemical components and mechanical properties of weld metal

|  | Base metal | Flux sign | | | | | | | | | | | | |
|---|---|---|---|---|---|---|---|---|---|---|---|---|---|---|
| No. 6 | 9N | K | 0.211 | | | | | | | 750 | | | 59 | |
| No. 7 | 9N | C | 0.240 | | | | | | | 860 | | | 57 | |
| No. 8 | 9N | C | 0.257 | | | | | | | 889 | | | 56 | |
| No. 9 | 9N | E | 0.187 | | | | | | | 699 | | | 59 | |
| No. 10 | 9N | F | 0.249 | | | | | | | 889 | | | 58 | |
| No. 11 | 9N | E | 0.234 | | | | | | | 828 | | | 59 | |
| No. 12 | 9N | E | 0.205 | | | | | | | 755 | | | 55 | |
| No. 13 | 9N | F | 0.265 | | | | | | | 934 | | | 55 | |
| No. 14 | 9N | E | | | | 0.200 | | | | 727 | | | 59 | |
| No. 15 | 9N | F | | | | 0.269 | | | | 929 | | | 55 | |
| No. 16 | 9N | E | | | | 0.239 | | | | 846 | | | 55 | |
| No. 17 | 9N | E | | | | 0.253 | | | | 911 | | | 56 | |

|  | C | Si | Mn | Ni | Fe | Cu | Cr | Mo | W | Nb | V | B | O | N |
|---|---|---|---|---|---|---|---|---|---|---|---|---|---|---|
| No. 18 | 0.022 | 0.18 | 0.10 | 10.8 | 89 | 0 | 0 | 0 | 0.32 | 0 | 0 | 0 | 0.020 | 0.0043 |
| No. 19 | 0.010 | 0.08 | 0.34 | 10.2 | 89 | 0.29 | 0 | 0 | 0 | 0 | 0 | 0 | 0.020 | 0.0041 |
| No. 20 | 0.028 | 0.13 | 0.33 | 10.4 | 89 | 0 | 0 | 0 | 0 | 0 | 0 | 0 | 0.017 | 0.0037 |
| No. 21 | 0.050 | 0.12 | 0.25 | 10.7 | 89 | 0 | 0 | 0 | 0 | 0 | 0 | 0 | 0.018 | 0.0037 |
| No. 22 | 0.046 | 0.13 | 0.28 | 10.5 | 89 | 0 | 0 | 0 | 0 | 0 | 0 | 0 | 0.007 | 0.0035 |
| No. 23 | 0.025 | 0.13 | 0.26 | 10.8 | 89 | 0 | 0 | 0 | 0 | 0 | 0 | 0 | 0.007 | 0.0059 |
| No. 24 | 0.045 | 0.22 | 0.25 | 9.9 | 90 | 0 | 0 | 0 | 0 | 0 | 0 | 0 | 0.007 | 0.0031 |
| No. 25 | 0.026 | 0.15 | 0.26 | 9.2 | 90 | 0 | 0 | 0 | 0 | 0 | 0 | 0 | 0.009 | 0.0045 |

|  | Base metal | Flux sign | Parameter (6) | Parameter (7) | Tensile strength (MPa) | Absorbed energy (J) |
|---|---|---|---|---|---|---|
| No. 18 | 9N | F | | 0.224 | 840 | 58 |
| No. 19 | 9N | F | | 0.214 | 785 | 59 |
| No. 20 | 9N | B | 0.222 | | 806 | 74 |
| No. 21 | 9N | I | 0.245 | | 848 | 72 |
| No. 22 | 9N | E | 0.239 | | 836 | 73 |
| No. 23 | 9N | E | 0.222 | | 816 | 77 |
| No. 24 | 9N | G | 0.230 | | 818 | 78 |
| No. 25 | 5N | G | 0.197 | | 732 | 70 |

TABLE 8

Chemical components and mechanical properties of weld metal

|  | C | Si | Mn | Ni | Fe | Cu | Cr | Mo | W | Nb | V | B | O | N |
|---|---|---|---|---|---|---|---|---|---|---|---|---|---|---|
| No. 26 | 0.032 | 0.16 | 0.31 | 10.9 | 89 | 0 | 0 | 0 | 0 | 0 | 0 | 0 | 0.017 | 0.0043 |
| No. 27 | 0.036 | 0.18 | 0.29 | 10.3 | 89 | 0 | 0 | 0 | 0 | 0 | 0 | 0 | 0.006 | 0.0080 |
| No. 28 | 0.031 | 0.18 | 0.30 | 10.5 | 89 | 0 | 0 | 0 | 0 | 0 | 0 | 0 | 0.016 | 0.0039 |
| No. 29 | 0.032 | 0.18 | 0.35 | 10.8 | 89 | 0 | 0 | 0 | 0 | 0 | 0 | 0 | 0.012 | 0.0037 |
| No. 30 | 0.035 | 0.13 | 0.30 | 10.4 | 89 | 0 | 0 | 0 | 0 | 0 | 0 | 0 | 0.009 | 0.0037 |
| No. 31 | 0.029 | 0.13 | 0.31 | 9.8 | 90 | 0 | 0 | 0 | 0 | 0 | 0 | 0 | 0.011 | 0.0041 |
| No. 32 | 0.027 | 0.14 | 0.30 | 10.6 | 88 | 0 | 0.21 | 0.22 | 0.23 | 0 | 0 | 0.001 | 0.013 | 0.0031 |
| No. 33 | 0.024 | 0.08 | 0.32 | 9.6 | 90 | 0 | 0 | 0.09 | 0 | 0 | 0 | 0 | 0.007 | 0.0096 |
| No. 34 | 0.024 | 0.12 | 0.30 | 9.7 | 90 | 0 | 0 | 0 | 0.09 | 0 | 0 | 0.004 | 0.009 | 0.0043 |
| No. 35 | 0.032 | 0.17 | 0.29 | 8.7 | 91 | 0 | 0 | 0.23 | 0 | 0 | 0 | 0 | 0.010 | 0.0041 |
| No. 36 | 0.030 | 0.18 | 0.31 | 10.3 | 89 | 0 | 0.21 | 0 | 0 | 0 | 0 | 0 | 0.019 | 0.0045 |
| No. 37 | 0.031 | 0.17 | 0.30 | 11.0 | 88 | 0 | 0.15 | 0 | 0 | 0 | 0 | 0 | 0.007 | 0.0037 |
| No. 38 | 0.029 | 0.09 | 0.25 | 9.1 | 90 | 0.11 | 0 | 0 | 0 | 0 | 0 | 0.002 | 0.008 | 0.0055 |

|  | Base metal | Flux sign | Parameter (6) | Parameter (7) | Tensile strength (MPa) | Absorbed energy (J) |
|---|---|---|---|---|---|---|
| No. 26 | 7N | I | 0.235 | | 846 | 69 |
| No. 27 | 9N | H | 0.228 | | 821 | 73 |
| No. 28 | 9N | J | 0.227 | | 825 | 71 |
| No. 29 | 9N | E | 0.236 | | 849 | 70 |
| No. 30 | 9N | B | 0.228 | | 814 | 71 |
| No. 31 | 9N | I | 0.212 | | 771 | 69 |
| No. 32 | 9N | B | | 0.261 | 943 | 65 |
| No. 33 | 9N | H | | 0.209 | 763 | 83 |
| No. 34 | 9N | J | | 0.228 | 765 | 84 |
| No. 35 | 5N | E | | 0.213 | 777 | 71 |
| No. 36 | 7N | I | | 0.234 | 864 | 70 |
| No. 37 | 9N | E | | 0.243 | 887 | 76 |
| No. 38 | 9N | E | | 0.212 | 729 | 77 |

TABLE 8-continued

Chemical components and mechanical properties of weld metal

|  | C | Si | Mn | Ni | Fe | Cu | Cr | Mo | W | Nb | V | B | O | N |
|---|---|---|---|---|---|---|---|---|---|---|---|---|---|---|
| No. 39 | 0.022 | 0.11 | 0.31 | 10.3 | 89 | 0 | 0 | 0 | 0 | 0 | 0 | 0 | 0.015 | 0.0039 |
| No. 40 | 0.032 | 0.16 | 0.30 | 10.5 | 89 | 0 | 0.15 | 0 | 0 | 0 | 0 | 0 | 0.017 | 0.0031 |
| No. 41 | 0.038 | 0.11 | 0.30 | 10.5 | 89 | 0 | 0 | 0 | 0 | 0 | 0 | 0 | 0.025 | 0.0039 |
| No. 42 | 0.032 | 0.13 | 0.29 | 8.1 | 91 | 0 | 0 | 0.02 | 0.05 | 0 | 0 | 0 | 0.025 | 0.0043 |
| No. 43 | 0.038 | 0.14 | 0.28 | 8.8 | 91 | 0 | 0 | 0 | 0 | 0 | 0 | 0 | 0.014 | 0.0035 |
| No. 44 | 0.030 | 0.10 | 0.27 | 8.9 | 91 | 0 | 0 | 0 | 0 | 0 | 0 | 0 | 0.023 | 0.0039 |
| No. 45 | 0.030 | 0.13 | 0.26 | 9.5 | 90 | 0 | 0 | 0 | 0 | 0.02 | 0.02 | 0 | 0.025 | 0.0033 |
| No. 46 | 0.026 | 0.16 | 0.32 | 10.0 | 90 | 0 | 0 | 0 | 0 | 0 | 0 | 0 | 0.010 | 0.0035 |
| No. 47 | 0.020 | 0.16 | 0.43 | 9.4 | 90 | 0 | 0 | 0 | 0 | 0 | 0 | 0 | 0.021 | 0.0033 |
| No. 48 | 0.024 | 0.18 | 0.25 | 9.1 | 90 | 0 | 0 | 0 | 0 | 0 | 0 | 0 | 0.024 | 0.0031 |
| No. 49 | 0.050 | 0.29 | 0.60 | 11.3 | 88 | 0 | 0 | 0 | 0 | 0 | 0 | 0 | 0.023 | 0.0033 |
| No. 50 | 0.025 | 0.18 | 0.30 | 8.8 | 91 | 0 | 0 | 0 | 0 | 0 | 0.01 | 0 | 0.024 | 0.0043 |

|  | Base metal | Flux sign | Parameter (6) | Parameter (7) | Tensile strength (MPa) | Absorbed energy (J) |
|---|---|---|---|---|---|---|
| No. 39 | 9N | H | 0.213 |  | 783 | 74 |
| No. 40 | 9N | H |  | 0.235 | 858 | 71 |
| No. 41 | 9N | L | 0.232 |  | 819 | 55 |
| No. 42 | 5N | K |  | 0.189 | 695 | 55 |
| No. 43 | 9N | J | 0.203 |  | 729 | 73 |
| No. 44 | 9N | I | 0.195 |  | 711 | 51 |
| No. 45 | 9N | A |  | 0.210 | 763 | 50 |
| No. 46 | 9N | E | 0.214 |  | 786 | 73 |
| No. 47 | 9N | E | 0.204 |  | 754 | 54 |
| No. 48 | 9N | F | 0.194 |  | 729 | 52 |
| No. 49 | 9N | B | 0.278 |  | 959 | 50 |
| No. 50 | 9N | E |  | 0.194 | 722 | 52 |

TABLE 9

Chemical components and mechanical properties of weld metal

|  | C | Si | Mn | Ni | Fe | Cu | Cr | Mo | W | Nb | V | B | O | N |
|---|---|---|---|---|---|---|---|---|---|---|---|---|---|---|
| No. 51 | 0.040 | 0.25 | 0.51 | 10.2 | 89 | 0.10 | 0 | 0 | 0.02 | 0.12 | 0.12 | 0 | 0.023 | 0.0041 |
| No. 52 | 0.022 | 0.18 | 0.29 | 9.4 | 90 | 0 | 0.02 | 0 | 0 | 0 | 0 | 0 | 0.025 | 0.0044 |
| No. 53 | 0.031 | 0.15 | 0.45 | 10.0 | 89 | 0 | 0 | 0 | 0 | 0 | 0 | 0 | 0.019 | 0.0037 |
| No. 54 | 0.029 | 0.21 | 0.43 | 9.1 | 90 | 0 | 0 | 0 | 0 | 0 | 0 | 0 | 0.018 | 0.0035 |
| No. 55 | 0.033 | 0.20 | 0.38 | 10.3 | 89 | 0 | 0 | 0 | 0 | 0 | 0 | 0 | 0.017 | 0.0041 |
| No. 56 | 0.050 | 0.11 | 0.24 | 9.5 | 90 | 0 | 0 | 0 | 0 | 0 | 0 | 0 | 0.016 | 0.0031 |
| No. 57 | 0.028 | 0.21 | 0.35 | 10.5 | 89 | 0 | 0 | 0 | 0 | 0 | 0 | 0 | 0.017 | 0.0045 |
| No. 58 | 0.023 | 0.11 | 0.34 | 9.6 | 90 | 0 | 0 | 0 | 0 | 0 | 0 | 0 | 0.019 | 0.0054 |
| No. 59 | 0.044 | 0.23 | 0.29 | 9.9 | 90 | 0 | 0 | 0 | 0 | 0 | 0 | 0 | 0.013 | 0.0045 |
| No. 60 | 0.031 | 0.14 | 0.32 | 10.2 | 89 | 0 | 0.02 | 0 | 0 | 0 | 0 | 0.003 | 0.018 | 0.0037 |
| No. 61 | 0.035 | 0.14 | 0.30 | 10.6 | 89 | 0 | 0 | 0 | 0.24 | 0 | 0 | 0 | 0.019 | 0.0033 |
| No. 62 | 0.052 | 0.07 | 0.24 | 8.6 | 91 | 0 | 0 | 0 | 0 | 0 | 0 | 0 | 0.021 | 0.0043 |
| No. 63 | 0.063 | 0.07 | 0.31 | 10.9 | 89 | 0 | 0 | 0 | 0 | 0 | 0 | 0 | 0.020 | 0.0037 |

|  | Base metal | Flux sign | Parameter (6) | Parameter (7) | Tensile strength (MPa) | Absorbed energy (J) |
|---|---|---|---|---|---|---|
| No. 51 | 9N | I |  | 0.274 | 847 | 50 |
| No. 52 | 9N | K |  | 0.200 | 752 | 50 |
| No. 53 | 9N | H | 0.225 |  | 806 | 60 |
| No. 54 | 9N | F | 0.209 |  | 764 | 63 |
| No. 55 | 9N | E | 0.230 |  | 830 | 61 |
| No. 56 | 9N | J | 0.224 |  | 777 | 64 |
| No. 57 | 9N | C | 0.228 |  | 832 | 61 |
| No. 58 | 9N | B | 0.204 |  | 749 | 62 |
| No. 59 | 9N | B | 0.231 |  | 823 | 65 |
| No. 60 | 9N | E |  | 0.238 | 807 | 63 |
| No. 61 | 9N | E |  | 0.239 | 853 | 61 |
| No. 62 | 9N | B | 0.210 |  | 720 | 48 |
| No. 63 | 9N | B | 0.263 |  | 876 | 44 |

|  | C | Si | Mn | Ni | Fe | Cu | Cr | Mo | W | Nb | V | B | O | N |
|---|---|---|---|---|---|---|---|---|---|---|---|---|---|---|
| No. 64 | 0.038 | 0.39 | 0.35 | 10.4 | 89 | 0 | 0 | 0 | 0 | 0 | 0 | 0 | 0.020 | 0.0034 |
| No. 65 | 0.041 | 0.20 | 0.84 | 8.3 | 91 | 0 | 0 | 0 | 0 | 0 | 0 | 0 | 0.023 | 0.0040 |
| No. 66 | 0.035 | 0.09 | 0.98 | 11.4 | 88 | 0 | 0 | 0 | 0 | 0 | 0 | 0 | 0.025 | 0.0037 |
| No. 67 | 0.039 | 0.14 | 0.41 | 7.0 | 92 | 0 | 0 | 0 | 0 | 0 | 0 | 0 | 0.024 | 0.0033 |
| No. 68 | 0.025 | 0.16 | 0.33 | 13.8 | 86 | 0 | 0 | 0 | 0 | 0 | 0 | 0 | 0.024 | 0.0035 |

TABLE 9-continued

Chemical components and mechanical properties of weld metal

| | C | Si | Mn | Ni | Fe | Cu | Cr | Mo | W | Nb | V | B | O | N |
|---|---|---|---|---|---|---|---|---|---|---|---|---|---|---|
| No. 69 | 0.035 | 0.28 | 0.89 | 10.1 | 89 | 0 | 0 | 0 | 0 | 0 | 0 | 0 | 0.022 | 0.0037 |
| No. 70 | 0.021 | 0.13 | 0.26 | 9.3 | 90 | 0 | 0 | 0 | 0 | 0 | 0 | 0 | 0.024 | 0.0037 |
| No. 71 | 0.048 | 0.23 | 0.71 | 11.5 | 88 | 0 | 0 | 0 | 0 | 0 | 0 | 0 | 0.022 | 0.0035 |
| No. 72 | 0.021 | 0.09 | 0.25 | 9.2 | 90 | 0 | 0 | 0 | 0.03 | 0.01 | 0 | 0 | 0.021 | 0.0034 |
| No. 73 | 0.035 | 0.24 | 0.53 | 10.9 | 88 | 0.18 | 0 | 0.35 | 0 | 0 | 0 | 0 | 0.022 | 0.0034 |
| No. 74 | 0.035 | 0.13 | 0.65 | 10.2 | 89 | 0.17 | 0 | 0 | 0 | 0 | 0 | 0.005 | 0.023 | 0.0034 |
| No. 75 | 0.020 | 0.16 | 0.33 | 9.9 | 90 | 0 | 0 | 0 | 0 | 0 | 0 | 0 | 0.020 | 0.0043 |

| | Base metal | Flux sign | Parameter (6) | Parameter (7) | Tensile strength (MPa) | Absorbed energy (J) |
|---|---|---|---|---|---|---|
| No. 64 | 9N | H | 0.242 | | 886 | 43 |
| No. 65 | 9N | C | 0.228 | | 780 | 48 |
| No. 66 | 9N | H | 0.277 | | 934 | 41 |
| No. 67 | 9N | H | 0.181 | 0.189 | 708 | 42 |
| No. 68 | 9N | H | 0.277 | | 1000 | 41 |
| No. 69 | 9N | K | 0.257 | | 953 | 42 |
| No. 70 | 9N | I | 0.193 | | 725 | 48 |
| No. 71 | 9N | J | 0.283 | | 965 | 40 |
| No. 72 | 9N | H | | 0.192 | 715 | 49 |
| No. 73 | 9N | E | | 0.284 | 997 | 42 |
| No. 74 | 9N | E | | 0.275 | 860 | 45 |
| No. 75 | 9N | D | 0.207 | | 771 | 48 |

TABLE 10

Chemical components and mechanical properties of weld metal

| | C | Si | Mn | Ni | Fe | Cu | Cr | Mo | W | Nb | V | B | O | N |
|---|---|---|---|---|---|---|---|---|---|---|---|---|---|---|
| No. 76 | 0.030 | 0.09 | 0.28 | 10.1 | 90 | 0 | 0 | 0 | 0 | 0 | 0 | 0 | 0.020 | 0.0033 |
| No. 77 | 0.033 | 0.17 | 0.27 | 9.8 | 90 | 0 | 0 | 0 | 0 | 0 | 0 | 0 | 0.021 | 0.0035 |
| No. 78 | 0.044 | 0.17 | 0.50 | 9.2 | 90 | 0 | 0 | 0 | 0 | 0 | 0 | 0 | 0.021 | 0.0037 |
| No. 79 | 0.035 | 0.18 | 0.33 | 10.2 | 89 | 0 | 0 | 0 | 0 | 0 | 0 | 0 | 0.022 | 0.0034 |
| No. 80 | 0.034 | 0.12 | 0.38 | 10.3 | 89 | 0 | 0 | 0 | 0 | 0 | 0 | 0 | 0.022 | 0.0044 |
| No. 81 | 0.049 | 0.17 | 0.51 | 10.1 | 89 | 0 | 0 | 0 | 0 | 0 | 0 | 0 | 0.009 | 0.0057 |
| No. 82 | 0.033 | 0.13 | 0.32 | 9.9 | 89 | 0.17 | 0 | 0 | 0 | 0 | 0 | 0 | 0.012 | 0.0033 |
| No. 83 | 0.032 | 0.16 | 0.30 | 10.5 | 89 | 0 | 0 | 0 | 0 | 0 | 0 | 0 | 0.025 | 0.0040 |
| No. 84 | 0.034 | 0.14 | 0.37 | 10.8 | 89 | 0 | 0.16 | 0 | 0 | 0 | 0 | 0 | 0.025 | 0.0043 |
| No. 85 | 0.032 | 0.12 | 0.31 | 10.7 | 89 | 0 | 0 | 0 | 0 | 0 | 0 | 0 | 0.025 | 0.0033 |
| No. 86 | 0.033 | 0.11 | 0.33 | 10.5 | 89 | 0 | 0 | 0.07 | 0 | 0 | 0 | 0.001 | 0.025 | 0.0043 |
| No. 87 | 0.054 | 0.09 | 0.24 | 7.8 | 92 | 0 | 0 | 0 | 0 | 0 | 0 | 0 | 0.022 | 0.0035 |
| No. 88 | 0.029 | 0.08 | 0.46 | 7.7 | 92 | 0 | 0 | 0 | 0 | 0 | 0 | 0 | 0.023 | 0.0029 |

| | Base metal | Flux sign | Parameter (6) | Parameter (7) | Tensile strength (MPa) | Absorbed energy (J) |
|---|---|---|---|---|---|---|
| No. 76 | 9N | E | 0.215 | | 777 | 49 |
| No. 77 | 9N | E | 0.216 | | 783 | 47 |
| No. 78 | 9N | H | 0.228 | | 792 | 46 |
| No. 79 | 9N | H | 0.228 | | 818 | 45 |
| No. 80 | 9N | D | 0.229 | | 813 | 45 |
| No. 81 | 9N | E | 0.249 | | 852 | 42 |
| No. 82 | 9N | E | | 0.227 | 803 | 40 |
| No. 83 | 9N | K | 0.227 | | 822 | 43 |
| No. 84 | 9N | K | | 0.245 | 883 | 40 |
| No. 85 | 9N | K | 0.230 | | 825 | 41 |
| No. 86 | 9N | K | | 0.238 | 832 | 42 |
| No. 87 | 9N | E | 0.199 | | 718 | 43 |
| No. 88 | 9N | D | 0.183 | | 697 | 44 |

| | C | Si | Mn | Ni | Fe | Cu | Cr | Mo | W | Nb | V | B | O | N |
|---|---|---|---|---|---|---|---|---|---|---|---|---|---|---|
| No. 89 | 0.031 | 0.16 | 0.44 | 10.4 | 89 | 0 | 0 | 0 | 0 | 0 | 0 | 0 | 0.025 | 0.0033 |
| No. 90 | 0.028 | 0.09 | 0.29 | 9.2 | 90 | 0 | 0.17 | 0 | 0 | 0 | 0 | 0 | 0.025 | 0.0038 |
| No. 91 | 0.073 | 0.12 | 0.48 | 7.9 | 91 | 0 | 0 | 0 | 0 | 0 | 0 | 0 | 0.023 | 0.0039 |
| No. 92 | 0.039 | 0.41 | 0.27 | 11.2 | 88 | 0 | 0 | 0 | 0 | 0 | 0 | 0 | 0.023 | 0.0033 |
| No. 93 | 0.042 | 0.12 | 1.03 | 8.2 | 91 | 0 | 0 | 0 | 0 | 0 | 0 | 0 | 0.022 | 0.0038 |
| No. 94 | 0.040 | 0.24 | 0.42 | 5.9 | 93 | 0 | 0 | 0 | 0 | 0 | 0 | 0 | 0.021 | 0.0035 |
| No. 95 | 0.031 | 0.14 | 0.29 | 14.1 | 85 | 0 | 0 | 0 | 0 | 0 | 0 | 0 | 0.023 | 0.0037 |
| No. 96 | 0.046 | 0.16 | 0.60 | 13.4 | 86 | 0 | 0 | 0 | 0 | 0 | 0 | 0 | 0.025 | 0.0033 |
| No. 97 | 0.012 | 0.05 | 0.21 | 8.7 | 91 | 0 | 0 | 0 | 0 | 0 | 0 | 0 | 0.022 | 0.0039 |
| No. 98 | 0.054 | 0.29 | 0.79 | 11.9 | 87 | 0 | 0 | 0 | 0 | 0 | 0 | 0 | 0.020 | 0.0035 |

TABLE 10-continued

Chemical components and mechanical properties of weld metal

| No. 99 | 0.010 | 0.05 | 0.21 | 8.7 | 91 | 0 | 0 | 0.03 | 0 | 0 | 0 | 0 | 0.021 | 0.0031 |
|---|---|---|---|---|---|---|---|---|---|---|---|---|---|---|
| No. 100 | 0.044 | 0.27 | 0.54 | 11.1 | 88 | 0.16 | 0.26 | 0 | 0 | 0.08 | 0.08 | 0 | 0.020 | 0.0043 |

|  | Base metal | Flux sign | Parameter (6) | Parameter (7) | Tensile strength (MPa) | Absorbed energy (J) |
|---|---|---|---|---|---|---|
| No. 89 | 9N | I | 0.232 |  | 830 | 41 |
| No. 90 | 9N | I |  | 0.207 | 765 | 43 |
| No. 91 | 9N | D | 0.233 |  | 753 | 37 |
| No. 92 | 9N | C | 0.253 |  | 929 | 28 |
| No. 93 | 9N | B | 0.234 |  | 777 | 32 |
| No. 94 | 9N | B | 0.167 |  | 659 | 38 |
| No. 95 | 9N | C | 0.285 |  | 1018 | 25 |
| No. 96 | 9N | F | 0.305 |  | 1041 | 21 |
| No. 97 | 9N | E | 0.169 |  | 680 | 35 |
| No. 98 | 9N | H | 0.302 |  | 1011 | 20 |
| No. 99 | 9N | K |  | 0.169 | 678 | 36 |
| No. 100 | 9N | H |  | 0.302 | 1024 | 21 |

The results in Tables 7 to 10 can lead to the following consideration.

First, No. 1 to No. 90 in Tables 7 to 10 are examples using wires of No. 1 to No. 90 in Tables 2 to 5 satisfying the requirements of the present invention. In each of No. 1 to No. 90, a weld metal excellent in both the cryogenic toughness IV (i.e., absorbed energy) and the strength TS (tensile strength) could be obtained though it was subjected to welding with a high heat input of 10.0 kJ/mm or more.

Of those examples, each example using flux A to L in Table 6 satisfying the composition of the present invention had good bead appearance.

On the other hand, No. 91 to No. 100 in Table 10 are examples using wires of No. 91 to No. 100 in Table 5 not satisfying the requirements of the present invention. The examples had the following defects.

In No. 91, the content of C in the wire and the weld metal was so large that the toughness deteriorated.

In No. 92, the content of Si in the wire and the weld metal was so large that the toughness deteriorated.

In No. 93, the content of Mn in the wire and the weld metal was so large that the toughness deteriorated.

In No. 94, the content of Ni in the wire and the weld metal was so small that the strength was reduced, and the toughness deteriorated.

In No. 95, the content of Ni in the wire and the weld metal was so large that the toughness deteriorated.

In No. 96, the content of Fe in the wire was so small that alloy components were excessive. Thus, the parameter of the relationship (6) in the weld metal was so large that the toughness deteriorated.

In No. 97, the parameter of the relationship (1) in the wire was so small that the strength was reduced, and the toughness deteriorated.

In No. 98, the parameter of the relationship (1) in the wire and the parameter of the relationship (6) in the weld metal were so large that the toughness deteriorated.

In No. 99, the parameter of the relationship (2) in the wire was so small that the strength was reduced, and the toughness deteriorated.

In No. 100, the parameter of the relationship (2) in the wire and the parameter of the relationship (7) in the weld metal were so large that the toughness deteriorated.

Although the present invention has been described in detail based on the aforementioned specific examples, the present invention is not limited to the specific examples, but any modification or change can be made thereon without departing from the category of the present invention.

The present application is based on Japanese Patent Application No. 2016-178802 filed on Sep. 13, 2016, and Japanese Patent Application No. 2017-030282 filed on Feb. 21, 2017, the whole contents of which are incorporated herein by reference.

The invention claimed is:

1. An electroslag welding wire, comprising, by mass % based on a total mass of the wire:
C: from more than 0% to 0.07%;
Si: from more than 0% to 0.50%;
Mn: from more than 0% to 1.0%;
Ni: from 6.0 to 15.0%; and
Fe: 79% or more,
wherein the electroslag welding wire satisfies the following relationship (1):

$$0.150 \leq C+(Si/30)+(Mn/20)+(Ni/60) \leq 0.300 \qquad (1),$$

wherein each of C, Si, Mn, and Ni in the relationship (1) represents a number corresponding to a content in mass % of each of C, Si, Mn, and Ni, wherein the units of mass % are omitted, based on the total mass of the wire;
wherein the wire is a flux cored wire comprising a slag forming agent in an amount of more than 0% to 15% based on the total mass of the wire;
the slag forming agent comprises at least one selected from the group consisting of $SiO_2$, CaO, $CaF_2$, $BaF_2$, MgO, $Al_2O_3$, MnO, $TiO_2$, $ZrO_2$, FeO, $Na_2O$, $K_2O$, and BaO, and satisfies the following relationship (4):

$$(CaO+CaF_2+BaF_2+MgO+BaO+Na_2O+K_2O)/(SiO_2 + 0.5(Al_2O_3+TiO_2+ZrO_2+MnO+FeO)) \geq 1.00 \qquad (4); \text{ and}$$

the left side of the relationship (4) is taken as >100 when the slag forming agent does not contain any of $SiO_2$, $Al_2O_3$, $TiO_2$, $ZrO_2$, MnO and FeO;
wherein each of the components CaO, $CaF_2$, $BaF_2$, MgO, BaO, $Na_2O$, $K_2O$, $SiO_2$, $Al_2O_3$, $TiO_2$, $ZrO_2$, MnO, and FeO in the relationship (4) represents a content in mass % of each component, wherein the units of mass % are omitted, based on the total mass of the wire.

2. An electroslag welding wire, comprising, by mass % based on a total mass of the wire:
C: from more than 0% to 0.07%;
Si: from more than 0% to 0.50%;

Mn: from more than 0% to 1.0%;
Ni: from 6.0 to 15.0%; and
Fe: 79% or more,
wherein the electroslag welding wire further comprises at least one element selected from the group consisting of Cu, Cr, Mo, W, Nb, V and B, and satisfies the following relationship (2):

$$0.150 \leq C+(Si/30)+(W/30)+(Mn/20)+(Cu/20)+(Ni/60)+(Cr/20)+(Mo/15)+(Nb/10)+(V/10)+(5 \times B) \leq 0.300 \quad (2),$$

wherein each of C, Si, W, Mn, Cu, Ni, Cr, Mo, Nb, V, and B in the relationship (2) represents a number corresponding to a content in mass % of each of C, Si, W, Mn, Cu, Ni, Cr, Mo, Nb, V, and B, wherein the units of mass % are omitted, based on the total mass of the wire;
wherein the wire is a flux cored wire comprising a slag forming agent in an amount of from more than 0% to 15% based on the total mass of the wire;
the slag forming agent comprises at least one selected from the group consisting of $SiO_2$, CaO, $CaF_2$, $BaF_2$, MgO, $Al_2O_3$, MnO, $TiO_2$, $ZrO_2$, FeO, $Na_2O$, $K_2O$, and BaO, and satisfies the following relationship (4):

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (4); \text{ and}$$

the left side of the relationship (4) is taken as >100 when the slag forming agent does not contain any of $SiO_2$, $Al_2O_3$, $TiO_2$, $ZrO_2$, MnO and FeO;
wherein each of the components CaO, $CaF_2$, $BaF_2$, MgO, BaO, $Na_2O$, $K_2O$, $SiO_2$, $Al_2O_3$, $TiO_2$, $ZrO_2$, MnO, and FeO in the relationship (4) represents a content in mass % of each component, wherein the units of mass % are omitted, based on the total mass of the wire.

3. The electroslag welding wire according to claim 1, further comprising:
at least one element selected from the group consisting of Ca, Mg, REM, Zr, Al and Ti, and satisfying the following relationship (3):

$$0.001 \leq 1.6(Ca+Mg)+1.25(REM+Zr)+Al+0.8Ti \leq 0.70 \quad (3),$$

wherein each of Ca, Mg, REM, Zr, Al, and Ti in the relationship (3) represents a content in mass % of each of Ca, Mg, REM, Zr, Al, and Ti, wherein the units of mass % are omitted, based on the total mass of the wire.

4. The electroslag welding wire according to claim 1, wherein the wire is a solid wire or a flux cored wire.

5. The electroslag welding wire according to claim 1, wherein the wire has been plated with Cu.

6. A flux used for electroslag welding together with the electroslag welding wire according to claim 1, the flux comprising, by mass %:
$SiO_2$: 0 to 35%;
CaO: 5 to 60%;
$CaF_2$: 3 to 50%;
$BaF_2$: 0 to 20%;
MgO: 0 to 20%;
$Al_2O_3$: 0 to 65%;
MnO: 0 to 20%;
$TiO_2$: 0 to 10%;
$ZrO_2$: 0 to 10%;
FeO: 0 to 5%;
$Na_2O$: 0 to 10%;
$K_2O$: 0 to 10%; and
BaO: 0 to 20%, and
wherein:
the flux satisfies the following relationship (5):

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (5); \text{ and}$$

the left side of the relationship (5) is taken as >100 when the flux does not contain any of $SiO_2$, $Al_2O_3$, $TiO_2$, $ZrO_2$, MnO and FeO,
wherein each of the components CaO, $CaF_2$, $BaF_2$, MgO, BaO, $Na_2O$, $K_2O$, $SiO_2$, $Al_2O_3$, $TiO_2$, $ZrO_2$, MnO, and FeO in the relationship (5) represents a content in mass % of each component, wherein the units of mass % are omitted, based on the total mass of the flux.

7. A weld joint produced by electroslag welding using the electroslag welding wire according to claim 1 and a flux for electroslag welding, wherein:
a weld metal in the weld joint comprises, by mass %:
C: from more than 0% to 0.07%;
Si: from more than 0% to 0.50%;
Mn: from more than 0% to 1.0%;
Ni: from 6.0 to 15.0%; and
Fe and inevitable impurities;
the weld metal satisfies the following relationship (6):

$$0.150 \leq C+(Si/30)+(Mn/20)+(Ni/60) \leq 0.300 \quad (6);$$

wherein each of C, Si, Mn, and Ni in the relationship (6) represents a number corresponding to a content in mass % of each of C, Si, Mn, and Ni, wherein the units of mass % are omitted, based on the total mass of the weld metal,
the flux for electroslag welding comprises:
$SiO_2$: 0 to 35%;
CaO: 5 to 60%;
$CaF_2$: 3 to 50%;
$BaF_2$: 0 to 20%;
MgO: 0 to 20%;
$Al_2O_3$: 0 to 65%;
MnO: 0 to 20%;
$TiO_2$: 0 to 10%;
$ZrO_2$: 0 to 10%;
FeO: 0 to 5%;
$Na_2O$: 0 to 10%;
$K_2O$: 0 to 10%;
BaO: 0 to 20%;
the flux satisfies the following relationship (5):

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (5); \text{ and}$$

the left side of the relationship (5) is taken as >100 when the flux does not contain any of $SiO_2$, $Al_2O_3$, $TiO_2$, $ZrO_2$, MnO and FeO,
wherein each of the components CaO, $CaF_2$, $BaF_2$, MgO, BaO, $Na_2O$, $K_2O$, $SiO_2$, $Al_2O_3$, $TiO_2$, $ZrO_2$, MnO, and FeO in the relationship (5) represents a content in mass % of each component, wherein the units of mass % are omitted, based on the total mass of the flux.

8. A weld joint produced by electroslag welding using the electroslag welding wire according to claim 1 and a flux for electroslag welding, wherein:
a weld metal in the weld joint comprises, by mass %:
C: from more than 0% to 0.07%;
Si: from more than 0% to 0.50%;
Mn: from more than 0% to 1.0%;
Ni: from 6.0 to 15.0%;
at least one element selected from the group consisting of Cu, Cr, Mo, W, Nb, V and B; and
Fe and inevitable impurities;
the flux for electroslag welding comprises:
$SiO_2$: 0 to 35%;
CaO: 5 to 60%;
$CaF_2$: 3 to 50%;
$BaF_2$: 0 to 20%;

MgO: 0 to 20%;
Al$_2$O$_3$: 0 to 65%;
MnO: 0 to 20%;
TiO$_2$: 0 to 10%;
ZrO$_2$: 0 to 10%;
FeO: 0 to 5%;
Na$_2$O: 0 to 10%;
K$_2$O: 0 to 10%;
BaO: 0 to 20%;
the flux satisfies the following relationship (5):

$$(CaO+CaF_2+BaF_2+MgO+BaO+Na_2O+K_2O)/(SiO_2+ 0.5(Al_2O_3+TiO_2+ZrO_2+MnO+FeO))\geq 1.00 \quad (5);$$

the left side of the relationship (5) is taken as >100 when the flux does not contain any of SiO$_2$, Al$_2$O$_3$, TiO$_2$, ZrO$_2$, MnO and FeO;
wherein each of the components CaO, CaF$_2$, BaF$_2$, MgO, BaO, Na$_2$O, K$_2$O, SiO$_2$, Al$_2$O$_3$, TiO$_2$, ZrO$_2$, MnO, and FeO in the relationship (5) represents a content in mass % of each component, wherein the units of mass % are omitted, based on the total mass of the flux, and
the weld metal satisfies the following relationship (7):

$$0.150\leq C+(Si/30)+(W/30)+(Mn/20)+(Cu/20)+(Ni/60)+ (Cr/20)+(Mo/15)+(Nb/10)+(V/10)+5\times B\leq 0.300 \quad (7),$$

wherein each of C, Si, W, Mn, Cu, Ni, Cr, Mo, Nb, V, and B in the relationship (7) represents a number corresponding to a content in mass % of each of C, Si, W, Mn, Cu, Ni, Cr, Mo, Nb, V, and B, wherein the units of mass % are omitted, based on the total mass of the weld metal.

9. The weld joint according to claim 7, wherein the weld metal further comprises, by mass %:
O: from 0% to 0.025%; and
N: from 0% to 0.010%.

10. The weld joint according to claim 8, wherein the weld metal further comprises, by mass %:
O: from 0% to 0.025%; and
N: from 0% to 0.010%.

11. The weld joint according to claim 7, wherein the weld joint is formed at abatement of a first steel plate and a second steel plate, wherein the first and second steel plates comprise from 5 to 10% of Ni as a base metal.

12. The weld joint according to claim 8, wherein the weld joint is formed at abatement of a first steel plate and a second steel plate, wherein the first and second steel plates comprise from 5 to 10% of Ni as a base metal.

13. The electroslag welding wire according to claim 2, further comprising at least one element selected from the group consisting of Ca, Mg, REM, Zr, Al and Ti, and satisfying the following relationship (3):

$$0.001\leq 1.6(Ca+Mg)+1.25(REM+Zr)+Al+0.8Ti\leq 0.70 \quad (3),$$

wherein each of Ca, Mg, REM, Zr, Al, and Ti in the relationship (3) represents a number corresponding to a content in mass % of each of Ca, Mg, REM, Zr, Al, and Ti, wherein the units of mass % are omitted, based on the total mass of the wire.

14. The electroslag welding wire according to claim 2, wherein the wire is a solid wire or a flux cored wire.

15. The electroslag welding wire according to claim 2, wherein the wire has been plated with Cu.

16. A flux used for electroslag welding together with the electroslag welding wire according to claim 2, the flux comprising, by mass %:
SiO$_2$: 0 to 35%;
CaO: 5 to 60%;
CaF$_2$: 3 to 50%;
BaF$_2$: 0 to 20%;
MgO: 0 to 20%;
Al$_2$O$_3$: 0 to 65%;
MnO: 0 to 20%;
TiO$_2$: 0 to 10%;
ZrO$_2$: 0 to 10%;
FeO: 0 to 5%;
Na$_2$O: 0 to 10%;
K$_2$O: 0 to 10%; and
BaO: 0 to 20%,
wherein:
the flux satisfies the following relationship (5):

$$(CaO+CaF_2+BaF_2+MgO+BaO+Na_2O+K_2O)/(SiO_2+ 0.5(Al_2O_3+TiO_2+ZrO_2+MnO+FeO))\geq 1.00 \quad (5); \text{ and}$$

the left side of the relationship (5) is taken as >100 when the flux does not contain any of SiO$_2$, Al$_2$O$_3$, TiO$_2$, ZrO$_2$, MnO and FeO,
wherein each of the components CaO, CaF$_2$, BaF$_2$, MgO, BaO, Na$_2$O, K$_2$O, SiO$_2$, Al$_2$O$_3$, TiO$_2$, ZrO$_2$, MnO, and FeO in the relationship (5) represents a content in mass % of each component, wherein the units of mass % are omitted, based on the total mass of the flux.

17. A weld joint produced by electroslag welding using the electroslag welding wire according to claim 2 and a flux for electroslag welding, wherein:
a weld metal in the weld joint comprises, by mass %:
C: from more than 0% to 0.07%;
Si: from more than 0% to 0.50%;
Mn: from more than 0% to 1.0%;
Ni: from 6.0 to 15.0%; and
Fe and inevitable impurities;
the weld metal satisfies the following relationship (6):

$$0.150\leq C+(Si/30)+(Mn/20)+(Ni/60)\leq 0.300 \quad (6);$$

wherein each of C, Si, Mn, and Ni in the relationship (6) represents a number corresponding to a content in mass % of each of C, Si, Mn, and Ni, wherein the units of mass % are omitted, based on the total mass of the weld metal,
the flux for electroslag welding comprises:
SiO$_2$: 0 to 35%;
CaO: 5 to 60%;
CaF$_2$: 3 to 50%;
BaF$_2$: 0 to 20%;
MgO: 0 to 20%;
Al$_2$O$_3$: 0 to 65%;
MnO: 0 to 20%;
TiO$_2$: 0 to 10%;
ZrO$_2$: 0 to 10%;
FeO: 0 to 5%;
Na$_2$O: 0 to 10%;
K$_2$O: 0 to 10%;
BaO: 0 to 20%;
the flux satisfies the following relationship (5):

$$(CaO+CaF_2+BaF_2+MgO+BaO+Na_2O+K_2O)/(SiO_2+ 0.5(Al_2O_3+TiO_2+ZrO_2+MnO+FeO))\geq 1.00 \quad (5); \text{ and}$$

the left side of the relationship (5) is taken as >100 when the flux does not contain any of SiO$_2$, Al$_2$O$_3$, TiO$_2$, ZrO$_2$, MnO and FeO,
wherein each of the components CaO, CaF$_2$, BaF$_2$, MgO, BaO, Na$_2$O, K$_2$O, SiO$_2$, Al$_2$O$_3$, TiO$_2$, ZrO$_2$, MnO, and FeO in the relationship (5) represents a content in mass % of each component, wherein the units of mass % are omitted, based on the total mass of the flux.

18. A weld joint produced by electroslag welding using the electroslag welding wire according to claim 2 and a flux for electroslag welding, wherein:
a weld metal in the weld joint comprises, by mass %:
C: from more than 0% to 0.07%;
Si: from more than 0% to 0.50%;
Mn: from more than 0% to 1.0%;
Ni: from 6.0 to 15.0%;
at least one element selected from the group consisting of Cu, Cr, Mo, W, Nb, V and B; and
Fe and inevitable impurities;
the flux for electroslag welding comprises:
$SiO_2$: 0 to 35%;
CaO: 5 to 60%;
$CaF_2$: 3 to 50%;
$BaF_2$: 0 to 20%;
MgO: 0 to 20%;
$Al_2O_3$: 0 to 65%;
MnO: 0 to 20%;
$TiO_2$: 0 to 10%;
$ZrO_2$: 0 to 10%;
FeO: 0 to 5%;
$Na_2O$: 0 to 10%;
$K_2O$: 0 to 10%;
BaO: 0 to 20%;
the flux satisfies the following relationship (5):

$$(CaO+CaF_2+BaF_2+MgO+BaO+Na_2O+K_2O)/(SiO_2+0.5(Al_2O_3+TiO_2+ZrO_2+MnO+FeO)) \geq 1.00 \quad (5);$$

the left side of the relationship (5) is taken as >100 when the flux does not contain any of $SiO_2$, $Al_2O_3$, $TiO_2$, $ZrO_2$, MnO and FeO; and wherein each of the components CaO, $CaF_2$, $BaF_2$, MgO, BaO, $Na_2O$, $K_2O$, $SiO_2$, $Al_2O_3$, $TiO_2$, $ZrO_2$, MnO, and FeO in the relationship (5) represents a content in mass % of each component, wherein the units of mass % are omitted, based on the total mass of the flux the weld metal satisfies the following relationship (7):

$$0.150 \leq C+(Si/30)+(W/30)+(Mn/20)+(Cu/20)+(Ni/60)+(Cr/20)+(Mo/15)+(Nb/10)+(V/10)+5 \times B \leq 0.300 \quad (7),$$

wherein each of C, Si, W, Mn, Cu, Ni, Cr, Mo, Nb, V, and B in the relationship (7) represents a number corresponding to a content in mass % of each of C, Si, W, Mn, Cu, Ni, Cr, Mo, Nb, V, and B, wherein the units of mass % are omitted, based on the total mass of the weld metal.

19. The weld joint according to claim 17, wherein the weld metal further comprises, by mass %:
O: from 0% to 0.025%; and
N: from 0% to 0.010%.

20. The weld joint according to claim 18, wherein the weld metal further comprising, by mass %:
O: from 0% to 0.025%; and
N: from 0% to 0.010%.

21. The weld joint according to claim 17, wherein the weld joint is formed on a steel plate comprising from 5 to 10% of Ni as a base metal.

22. The weld joint according to claim 18, wherein the weld joint is formed on a steel plate comprising from 5 to 10% of Ni as a base metal.

* * * * *